United States Patent
Okada et al.

(10) Patent No.: US 7,785,700 B2
(45) Date of Patent: Aug. 31, 2010

(54) SURFACE-COATED CUTTING TOOL

(75) Inventors: Yoshio Okada, Itami (JP); Naoya Omori, Itami (JP); Haruyo Fukui, Itami (JP); Junya Okida, Itami (JP)

(73) Assignee: Sumitomo Electric Hardmetal Corp., Hyogo (JP)

(*) Notice: Subject to any disclaimer, the term of this patent is extended or adjusted under 35 U.S.C. 154(b) by 878 days.

(21) Appl. No.: 10/599,086

(22) PCT Filed: Apr. 13, 2005

(86) PCT No.: PCT/JP2005/007180

§ 371 (c)(1),
(2), (4) Date: Sep. 19, 2006

(87) PCT Pub. No.: WO2005/099945

PCT Pub. Date: Oct. 27, 2005

(65) Prior Publication Data

US 2007/0218313 A1  Sep. 20, 2007

(30) Foreign Application Priority Data

Apr. 13, 2004 (JP) ............................. 2004-118340
Apr. 13, 2004 (JP) ............................. 2004-118341
Apr. 13, 2004 (JP) ............................. 2004-118346
Apr. 13, 2004 (JP) ............................. 2004-118348

(51) Int. Cl.
    *B32B 9/00* (2006.01)
(52) U.S. Cl. ............................. 428/216; 51/307; 51/309; 428/217; 428/336; 428/698; 428/699; 428/704
(58) Field of Classification Search .................. 51/307, 51/309; 428/216, 217, 336, 698, 699, 704
See application file for complete search history.

(56) References Cited

U.S. PATENT DOCUMENTS 4,746,563 A  5/1988  Nakano et al.

(Continued)

FOREIGN PATENT DOCUMENTS

AU  607805 B2  3/1991

(Continued)

OTHER PUBLICATIONS

International Preliminary Report on Patentability for PCT/JP2005/007180 issued on Oct. 19, 2006.

(Continued)

*Primary Examiner*—Archene Turner
(74) *Attorney, Agent, or Firm*—Ditthavong, Mori & Steiner, P.C.

(57) ABSTRACT

A coating layer formed from an outermost layer and an inner layer disposed on a substrate surface of a surface coated cutting tool. The inner layer is formed from a periodic table group IVa, Va, VIa metal, Al, Si, B compound. The outermost layer is formed from aluminum nitride or aluminum carbonitride. The outermost layer has a chlorine content of more than 0 and no more than 0.5 atomic percent. The protective coating on the tool surface is made easier to form during cutting by further adding a predetermined amount of chlorine to the film formed from aluminum nitride, which provides thermal stability and lubricity. Lubricity can be increased by using this protective coating.

11 Claims, 1 Drawing Sheet

U.S. PATENT DOCUMENTS

| | | | |
|---|---|---|---|
| 5,915,162 A * | 6/1999 | Uchino et al. | 428/698 |
| 5,985,427 A | 11/1999 | Ueda et al. | |
| 6,274,257 B1 * | 8/2001 | Aharonov et al. | 428/704 |
| 7,166,155 B2 * | 1/2007 | Ishikawa | 428/699 |
| 7,226,670 B2 * | 6/2007 | Derflinger et al. | 51/307 |

FOREIGN PATENT DOCUMENTS

| | | |
|---|---|---|
| JP | 54-152281 A | 11/1979 |
| JP | 59-27302 B2 | 7/1984 |
| JP | 59-27382 B2 | 7/1984 |
| JP | 05-043323 A | 2/1993 |
| JP | 07-100701 A | 4/1995 |
| JP | 08-187604 A | 7/1996 |
| JP | 10-158861 A | 6/1998 |
| JP | 2861113 B2 | 2/1999 |
| JP | 11-124672 A | 5/1999 |
| JP | 11-302830 A | 11/1999 |
| JP | 2000-158209 A | 6/2000 |
| JP | 2001-341008 A | 12/2001 |
| JP | 2002-263933 A | 9/2002 |
| JP | 2002-263941 A | 9/2002 |
| JP | 2002-273607 A | 9/2002 |
| JP | 2003-019604 A | 1/2003 |
| JP | 2003-025112 A | 1/2003 |
| JP | 2003-225808 A | 8/2003 |
| JP | 2003-275911 A | 9/2003 |
| WO | WO 03/061885 A1 | 7/2003 |

OTHER PUBLICATIONS

Office Action issued in corresponding CN Application No. 2005800110513 on Feb. 22, 2008 (English Translation included).

Second Chinese Office Action for corresponding CN Application No. 2005800110513, Mar. 20, 2009, China.

Supplementary European Search Report, dated Sep. 2, 2009, from the European Patent Office re Application No. 05730480.0.

* cited by examiner (A)

1 End cutting edge
3 Flute
2 Peripheral cutting edge
4 Body
5 Shank (B)

6 Tip
7 Flute
8 Body
9 Shank

SURFACE-COATED CUTTING TOOL

CROSS-REFERENCE TO PRIOR APPLICATIONS

This application is a U.S. national phase application under 35 U.S.C. §371 of International Patent Application No. PCT/JP2005/007180, filed Apr. 13, 2005, and claims the benefit of Japanese Application No. 2004-118340, filed Apr. 13, 2004, Japanese Application No. 2004-118341, filed Apr. 13, 2004, Japanese Application No. 2004-118346, filed Apr. 13, 2004, and Japanese Application No. 2004-118348, filed Apr. 13, 2004, all of which are incorporated by reference herein. The International Application was published in Japanese on Oct. 27, 2005 as International Publication No. WO 2005/099945 A1 under PCT Article 21(2).

TECHNICAL FIELD

The present invention relates to a cutting tool, such as a throw-away insert or drill, equipped with a coating layer on a substrate surface.

More specifically, the present invention relates to a surface-coated cutting tool with superior lubricity that is suited for cutting steel and the like.

BACKGROUND ART

Examples of widely known cutting tools include throw-away inserts used for turning and milling as well as end mills generally used for side milling, beveling, and fluting various types of metals, and drills used for boring. These end mills and drills are formed with a section that includes a cutting section, known as the body, and a section known as the shank that is mounted in a drive device. Examples of bodies include: solid bodies, where the body is formed integrally from a cutting section and a support that includes a flute for supporting the cutting section and allowing chips to be ejected; brazed bodies, where the cutting section is brazed to the support; and throw-away bodies, where the cutting section can be attached to and removed from the support. Conventionally, solid bodies are formed from high-speed tool steel or cemented carbide. Brazed bodies are formed by brazing a cutting section formed from a hard material such as cemented carbide to a support formed from high-speed tool steel.

In recent years, various cutting tool materials have been developed to meet the demand for higher efficiency and precision in cutting. In the process of developing these materials, ceramic coating technology, in which a coating layer formed from ceramics is applied to the surface of a tool substrate, has become a crucial technology in cutting tools. For example, the use of titanium-based ceramics, e.g., titanium carbide (TiC), titanium nitride (TiN), titanium carbonitride (Ti(C, N)), and oxide-based ceramics, e.g., alumina ($Al_2O_3$) and zirconia ($ZrO_2$) to form coating layers for cutting tools used in high-speed, high-efficiency operations involving high speeds and high feeds is widely known. Japanese Laid-Open Patent Publication Number Hei 11-124672 describes a throw-away insert equipped with a coating layer with a defined X-ray diffraction index of orientation. This insert is used in high-speed, high-efficiency operations involving high speeds and high feeds. In addition to throw-away inserts, this type of ceramic coating technology is also becoming widely used in solid and brazed tools that are often used in end mills and drills.

The inclusion of a ceramic coating on a cutting tool improves surface hardness and heat resistance and allows the tool to handle high-speed, high-efficiency operations involving high speeds and high feeds. In addition to this type of high-speed, high-efficiency operation, in recent years attention has been given to methods that protect the environment such as mist cutting, where the use of cutting oil is drastically reduced, or dry cutting, where cutting oil is not used. To handle these types of operations, throw-away inserts equipped with a coating layer with superior welding resistance or a coating layer with a chip sliding feature (see Japanese Laid-Open Patent Publication Number Hei 10-158861 and Japanese Laid-Open Patent Publication Number 2003-225808), and a drill coated with a CrN film having lubricity (Japanese Laid-Open Patent Publication Number 2003-275911) have been proposed. In addition, cutting tools equipped with an aluminum nitride coating layer for improved heat dissipation and the like have been proposed (see Japanese Examined Patent Publication Number Sho 59-27382; Japanese Patent Publication Number 2861113; Japanese Laid-Open Patent Publication Number 2002-273607; Japanese Laid-Open Patent Publication Number 2002-263933; Japanese Laid-Open Patent Publication Number 2002-263941; Japanese Laid-Open Patent Publication Number 2003-19604; Japanese Laid-Open Patent Publication Number 2003-25112; and Japanese Examined Patent Publication Number Sho 59-27302.

However, all of the conventional cutting tools described above have insufficient lubricity, especially for mist cutting and dry cutting, in which no cutting oil is used. This leads to reduced tool life. Thus, there is a need to improve lubricity so that tool life can be extended. With end mills and drills in particular, high lubricity is important for increasing the ability of chips to be ejected out through the flute formed on the body. High lubricity is also preferable for cutting materials that tend to weld and for deep hole boring, where the ability of chips to be ejected out is important.

SUMMARY OF THE INVENTION

The present invention provides a surface-coated cutting tool with improved lubricity and extended tool life by defining the composition of an outermost layer to contain predetermined elements so that lubricity is provided for the outermost layer, which makes initial contact with the workpiece during cutting, and by defining the composition of the inner layer to improve wear resistance and fracturing resistance.

More specifically, the present invention provides a surface-coated cutting tool equipped with a coating layer on a substrate surface. The coating layer is formed from an inner layer formed on a substrate and an outermost layer formed over the inner layer. The outermost layer and the inner layer meet the following conditions.

<Inner Layer>

The inner layer is formed from a compound formed from a first element and a second element, the first element being at least one element selected from a group consisting of a periodic table group IVa, Va, VIa metal, Al, Si, and B, and the second element being at least one element selected from a group consisting of B, C, N, and O (except if the first element is B by itself, the second element is an element other than B).

<Outermost Layer>

The outermost layer is formed from aluminum nitride or aluminum carbonitride. The outermost layer contains more than 0 and no more than 0.5 atomic percent chlorine.

The present inventors investigated the interrelationships between coating layers and ways of improving coating layer properties in order to extend tool life even when a cutting tool is used in usage environments that impose harsh conditions, e.g., in the case of throw-away inserts used for turning and the like, cutting operations that involve high temperatures for the cutting edge such as dry cutting, where no cutting oil is used, and intermittent cutting, and, in the case of drills and end mills, cutting operations such as mist cutting, dry cutting, boring, and cutting of workpieces that tend to easily weld. As a result, it was found that tool life could be extended efficiently by using a coating film with superior lubricity as the outermost layer and forming the inner layer with films having a predetermined composition. More specifically, by forming the outermost layer from a film formed from aluminum nitride containing a predetermined amount of chlorine as described above, lubricity can be provided even in cutting operations such as dry cutting, intermittent cutting, and boring. As a result, welding resistance is improved and the coating layer can be prevented from peeling. In the case of throw-away inserts used in the turning and the like the superior lubricity reduces the cutting force received by the tool and, also, fracturing resistance and wear resistance can be improved by forming the inner layer from films having a predetermined composition while using a film with superior lubricity, "shredding" of the workpiece surface after cutting due to contact with the cutting tool is reduced, thus providing high-quality, high-precision workpieces. Furthermore, in the case of drills and end mills the superior lubricity reduces the cutting force received by the tool and improves ejection of chips and breakage resistance, while the use of predetermined compositions for the films in the inner layer improves wear resistance, chipping resistance, and fracturing resistance. Further, using a coating layer with superior lubricity, the product quality can be improved, e.g., the roundness of holes can be improved, thus providing high-quality and high-precision workpiece products. The present invention was defined based on these observations.

The improvement in tool life described above is currently believed to be for the following reasons. The aluminum nitride film provides thermal stability and lubricity. Also, when an aluminum nitride film contains a predetermined amount of chlorine, in the case of cutting operations with throw-away inserts that tend to raise the temperature of the cutting edge, e.g., dry cutting and high-speed and high-feed cutting, a protective film is easy to form on the tool surface when the cutting edge reaches a high temperature of approximately 900 deg C. during cutting. This protective film can improve lubricity and is believed to improve the welding resistance of the tool. Also, by forming films from predetermined compositions for the inner layer, reduction of wear resistance can be avoided, thus making it possible to provide a tool with both superior lubricity and superior wear resistance. With drills and end mills, the use of an aluminum nitride film containing a predetermined amount of chlorine is believed to reduce the friction coefficient between chips and areas associated with cutting (specifically, the tool surfaces at the cutting edge and the flutes). As a result, at the area around the cutting edge, the work needed to generate chips is reduced and the chips are more easily ejected, leading to adequate tool life for cutting operations such as dry cutting, deep boring, and cutting of easily welded workpieces, while the quality and cutting precision of the workpiece is also improved. It is also believed that by including a predetermined amount of chlorine in the outermost layer, in addition to the friction coefficient being reduced, the formation of a protective film on the tool surface becomes easier in cutting operations that tend to result in high temperature and high pressure for the cutting edge, e.g., dry cutting and deep boring. This protective film is believed to improve the lubricity of the tool so that the welding resistance of the tool is improved. Furthermore, it is believed that by forming the inner layer from films having predetermined compositions, it is possible to avoid reducing wear resistance so that a tool with both superior lubricity and wear resistance can be provided. The present invention is described in further detail below.

(Coating Layer)
<Outermost Layer>

In the present invention, the outermost layer, which makes initial contact with the workpiece when performing a cutting operation, is formed from an aluminum compound such as aluminum nitride or aluminum carbonitride. Then, in the present invention, chlorine is included in this film formed from aluminum nitride. More specifically, more than 0 and no more than 0.5 atomic percent of chlorine is included in the outermost layer. The inclusion of no more than 0.5 atomic percent of chlorine in the outermost layer makes it possible for a protective film to form in high-temperature cutting environments, thus improving lubricity. If the chlorine content exceeds 0.5 atomic percent, the film forming the outermost layer can peel easily. If there is no chlorine, the protective film described above does not form. It is preferable for the chlorine content to be at least 0.07 atomic percent and no more than 0.3 atomic percent. If a chemical vapor deposition (CVD) technique such as thermal CVD or plasma CVD is used to form the aluminum nitride film containing more than 0 and no more than 0.5 atomic percent of chlorine in the outermost layer, the reaction gas can be a gas containing chlorine such as hydrogen chloride (HCl). In this case, the hydrogen chloride content can be more than 0 and less than 5.0 percent by volume, and more specifically no more than 1.0 percent by volume, where the entire reaction gas is defined as 100 percent by volume. If a physical vapor deposition (PVD) technique such as arc ion plating or magnetron sputtering is used to form the aluminum nitride film, chlorine ions can be implanted after the film is formed using ion implantation. The chlorine content in the outermost layer can be adjusted by controlling the amount of implantation as appropriate.

The outermost layer can further include oxygen. More specifically, in addition to aluminum nitride and aluminum carbonitride, the outermost layer can be formed as an aluminum oxynitride or an aluminum carbon oxynitride film. The inclusion of oxygen makes the protective film easier to form.

With this type of outermost layer, it is preferable for the film thickness to be no more than ½ the total film thickness of the inner layer described later. This allows the coating layer to provide a good balance between wear resistance and lubricity, e.g., for forming the protective film. If the thickness exceeds ½, the outermost layer becomes too thick, so that while superior lubricity is provided, wear tends to take place, possibly leading to shorter tool life. More specifically, if the cutting tool of the present invention is to be a throw-away insert, it is preferable for the film thickness of the outermost layer to be at least 0.03 microns and no more than 10 microns. If the cutting tool of the present invention is to be a drill or an end mill, it is preferable for the thickness to be at least 0.03 microns and no more than 8 microns. If the thickness is less than 0.03 microns, obtaining adequate lubricity becomes difficult. If the thickness exceeds 10 microns or 8 microns, the outermost layer becomes thicker than the inner layer, tending to reduce wear resistance as described above. Film thickness can be measured, for example, by cutting the cutting tool, e.g., an insert or drill with a coating layer, and observing the cross-section under an SEM (scanning electron microscope).

At the outermost layer, it is preferable for the surface roughness at areas on the outermost layer near the ridge line of the cutting edge at areas that come into contact with the workpiece to have an Rmax relative to a reference length of 5 microns of no more than 1.3 microns, where the roughness is measured by observing a cross-section of the cutting tool. Based on studies by the inventors, it was found that when the surface roughness of these contact areas of the outermost layers has an Rmax that exceeds 1.3 microns, welding tends to take place with the workpiece, making it difficult to provide the advantages of lubricity. The surface roughness is measured by cutting the substrate after the outermost layer is formed, performing lapping on the cross-section, observing the roughness on the film surface using a metallurgical microscope or an electron microscope, and determining the maximum surface roughness (Rmax) within a reference length of 5 microns, thus eliminating macroscopic swelling and the like. Also, this surface roughness can be controlled to some degree through film forming conditions. For example, crystal structure becomes more coarse at higher film forming temperatures, and by extension there is more surface roughness on the film surface. Thus, film forming temperature can be lowered to reduce surface roughness. Thus, Rmax can be set to no more than 1.3 microns when the film is formed without requiring special treatment after film formation. However, it is also possible to change surface roughness after film formation, e.g., by polishing with a buff, brush, barrel, elastic grindstone or the like, or by performing surface reforming through microblasting, shot peening, or ion-beam radiation.

<Inner Layer>

The inner layer is formed from a compound formed from a first element and a second element, the first element being at least one element selected from a group consisting of a periodic table group IVa, Va, VIa metal, Al, Si, and B, and the second element being at least one element selected from a group consisting of B, C, N, and O (except if the first element is B by itself, the second element is an element other than B). More specifically, films formed from compounds containing Ti such as TiCN, TiN, TiBN, and TiCNO and films formed from oxides such as $Al_2O_3$ and $ZrO_2$ provide superior wear resistance and are preferable. Also, since TiN has good adhesion with the substrate, it is preferable for it to be used as the innermost layer. The inner layer can be formed from a single film or can be formed from multiple films. If the inner layer is formed from multiple films, the films should have different compositions or structures. The inner layer can be formed either through CVD, e.g., thermal CVD or plasma CVD, or through PVD, e.g., arc ion plating or magnetron sputtering. The inner layer can be formed using widely known conditions.

By forming the inner layer with a Ti compound film as described above, superior wear resistance is provided. More specifically, a film formed from TiCN is suitable, and in particular it is preferable to use a TiCN film with columnar structure. Furthermore, it is more preferable to use a film formed from TiCN that has a columnar structure with an aspect ratio of at least 3, where an index of orientation (orientation intensity coefficient) TC(220), TC(311), or TC(422) of a crystal face (220), crystal face (311), or crystal face (422) respectively is the maximum index of orientation. By using a TiCN film with a structure having a predetermined shape and with a crystal face having a predetermined orientation, improved wear resistance and extended tool life is provided even in harsh cutting environments, e.g., where the cutting edge reaches high temperatures.

The columnar structure is defined to have an aspect ratio of at least 3 because if the aspect ratio is less than 3, there tends to be reduced wear resistance under high-temperature cutting conditions. The desired wear resistance is difficult to obtain with a granular structure.

A columnar structure can be formed, for example, if the film is formed using CVD, by using a raw gas that is an organic carbonitride that allows a columnar structure to be easily formed such as $CH_3CN$ and by controlling the reaction atmosphere temperature (at least 800 deg C. and no more than 950 deg C.) and pressure (at least 4.0 kPa and no more than 80 kPa). If a gas other than an organic carbonitride is used, the film growth rate can be increased, the film forming temperature can be increased, the concentration of the raw gas can be increased, or the like. An aspect ratio of at least 3 can be achieved, for example, by reducing the average grain size of the crystal (preferably at least 0.05 microns and no more than 1.5 microns) and growing the film structure with a columnar structure. This can be done, for example, by appropriately adjusting the TiCN film forming conditions (film forming temperature, film forming pressure, gas composition, gas flow rate, gas flow volume, and the like). It is also possible to appropriately adjust the surface state of the substrate below or directly below the TiCN film or the surface state of the coating film located below or directly below the TiCN film. More specifically, it is possible, for example, to control the surface roughness of the substrate surface to have an Rmax (5 microns reference length) of at least 0.05 microns and no more than 1.5 microns and to form the TiCN film by appropriately changing the film forming conditions. Alternatively, it is possible to control the surface roughness, chemical state, or grain diameter (preferably at least 0.01 microns and no more than 1.0 microns), or the like of a film, and to form the TiCN film on top of this film with the film forming conditions adjusted appropriately.

The aspect ratio described above can, for example, be measured in the following manner. A specular polish is applied to a cross-section of the coating layer and the grain boundary of the structure of the columnar structure TiCN film is etched. Then, treating the widths of individual crystals parallel to the substrate at a position corresponding to ½ the film thickness of the TiCN film as grain sizes, the grain diameters of the crystals are measured and an average is calculated (the average is used as the average grain size). The proportion of the average grain size relative to the film thickness is calculated by dividing the film thickness by the obtained average grain size, and this value can be used as the aspect ratio.

This TiCN film with a predetermined aspect ratio has the predetermined crystal orientations for the crystal faces as described. The index of orientation TC is defined as follows.

$$TC(hk1) = \frac{I(hk1)}{I_0(hk1)} \left( \frac{1}{8} \sum \frac{I(hk1)}{I_0(hk1)} \right)^{-1} \qquad \text{Equation 1}$$

I(hk1): measured diffraction intensity of the (hk1) face; $I_0$(hk1): average powder diffraction intensity based on JCPDS file of the carbide of the metal forming the (hk1) face and the nitride of the same metal; (hk1): the eight faces (111), (200), (220), (311), (331), (420), (422), (511)

Making one of the indices of orientation (orientation intensity coefficient) TC(311), TC(220), or TC(422) be the maximum can be achieved by appropriately adjusting film forming conditions (film forming temperature, film forming pressure, gas composition, gas flow rate, gas flow volume, and the like) for the TiCN film. It is also possible to appropriately adjust the surface state of the substrate below or directly below the TiCN film or the surface state of the film below or directly below the TiCN film. More specifically, for example, the TiCN film can be formed on a substrate that has been prepared with a surface roughness Rmax (5 microns reference length) of at least 0.05 microns and no more than 1.5 microns, with the film forming conditions appropriately adjusted. Alternatively, for one of the films, the surface roughness, the chemical state of the grains, the grain size, or the like can be controlled, and then the TiCN film can be formed on top of this film with appropriately adjusted film forming conditions.

It is preferable for the diffraction intensity to be measured for a flat section (smooth section) of the substrate cross-section so that surface indentations on the substrate do not create reflections. Also, the JCPDS file (Powder Diffraction File Published by JCPDS International Center for Diffraction Data) does not provide identification of X-ray diffraction intensity for carbonitrides of periodic table IVa, Va, VIa group metals. Thus, identification of diffraction intensity for the TiCN film, which is one of these carbonitrides, can be obtained by comparing diffraction data for the carbide of titanium (Ti), which is the corresponding metal, diffraction data for the nitride of the same, and the measured diffraction data for the TiCN carbonitride. Based on this, the face indices can be estimated, and the diffraction intensities for the face indices can be obtained.

If the inner layer is formed from multiple films, at least one of the films can be the TiCN film with the predetermined aspect ratio and the like as described above, and the other films can be compound films formed from a first element and a second element as described above. The inner layer can, thus, be formed from this TiCN film and this compound film. The compound film can be a film having a composition different from that of the TiCN film or can be a TiCN film having a structure or orientation that is different from this TiCN film. The TiCN film can be a single film or can be multiple films. Either the compound film or the TiCN film can be positioned closer toward the substrate. In other words, the structure, starting from the substrate side, can be the TiCN film, the compound film, the outermost layer, or can be the compound film, the TiCN film, and the outermost layer.

If the cutting tool of the present invention is to be a throw-away insert, it is preferable for the film thickness of the coating layer, formed from the outermost layer and the inner layer, to be at least 0.1 microns and no more than 30.0 microns. If the film thickness of the entire coating layer is less than 0.1 microns, improved wear resistance becomes difficult to obtain. If the thickness exceeds 30.0 microns, the thicker coating layer improves wear resistance, but the increased hardness tends to increase fractures, leading to shortened tool life and making stable cutting difficult. If the cutting tool of the present invention is to be a drill or end mill, it is preferable for the film thickness of the coating layer, formed from the outermost layer and the inner layer, to be at least 0.1 microns and no more than 24 microns. If the film thickness of the entire coating layer is less than 0.1 microns, improved wear resistance tends to become difficult to obtain. If the thickness exceeds 24 microns, the thicker coating layer improves wear resistance, but the peeling resistance and fracture resistance is reduced. This leads to frequent chipping, making stable cutting difficult.

It is preferable for the outermost layer described above to be formed with a film hardness lower than that of at least one of the films forming the inner layer. In other words, it is preferable for the inner layer to include a film having a film hardness that is greater than that of the outermost layer. With an outermost layer having a low film hardness, it is possible to prevent fractures that occur when the tool initially engages with the workpiece or in intermittent cutting. This makes it possible to provide stable cutting. In addition to changing film composition, film hardness can be adjusted by controlling the film structure through the film forming conditions. Given the same film composition, film hardness tends to be greater when the film structure is finer. The hardness of the films can be measured by cutting the cutting tool with the coating layer, e.g., the insert or the drill, and measuring the hardness at the cross-section.

The coating layer coats at least the areas of the substrate surface associated with cutting. The coating layer can cover the entire substrate surface. In the case of a throw-away insert, for example, the areas associated with cutting are the ridge line of the cutting edge, the rake face, and the flank face. In the case of an end mill or a drill, the area associated with cutting is what is generally known as the body, formed from a cutting section and a support. FIG. 1 (A) is a simplified front-view drawing of an end mill. FIG. 1 (B) is a simplified front-view drawing of a drill. More specifically, in the case of an end mill, the areas associated with cutting are, as shown in FIG. 1 (A), a cutting edge section formed from an end surface (an end cutting edge 1) and a side surface (a peripheral cutting edge 2) associated with the actual cutting and a flute 3 that comes into contact with chips. Instead of forming the coating layer just on the body, it is also possible to have the coating layer extend from a body 4, where the flute is formed from the end surface, to the section referred to as a shank 5 that is mounted in the driving device. In the case of a drill, the areas associated with cutting are the tip 6 associated with the actual cutting and a groove (flute) 7 that comes into contact with the chips. With a drill as well, it is possible instead of forming the coating layer only on a body 8 to extend the coating layer from the body 8, where the end and the flute are formed, to a shank 9 that is mounted in the driving device. For the areas where the coating layer is not formed, appropriate masking can be applied during film forming or polishing or the like can be performed after the film has been formed to remove the film.

Of course, after the coating film formed from the outermost layer and the inner layer are formed on the substrate surface, it is possible, as in the conventional technology, to apply surface treatment such as polishing or applying a laser to the ridge line of the cutting edge. With the cutting tool of the present invention, this type of surface treatment does not significantly reduce the characteristics of the coating layer.

(Substrate)

It is preferable for the substrate of the present invention, especially the areas of the substrate associated with cutting, to be formed from a WC-based cemented carbide, cermet, high-speed steel, ceramic, a cubic boron nitride sintered body, or a silicon nitride sintered body. More specifically, if the cutting tool of the present invention is a drill or an end mill, it is preferable for at least the areas of the substrate associated with cutting to be formed from a WC-based cemented carbide, cermet, high-speed steel, or a cubic boron nitride sintered body. If a substrate formed from a WC-based cemented carbide or cermet is used, the advantages of the present invention are provided even if, on the substrate surface or the areas of the substrate surface associated with cutting, there is a reformed surface layer such as a "β-free layer" in which non-WC hardness phase has been removed, a binder-rich layer that is rich in binder and from which the hardness phase has been removed, or a hardened surface layer in which the binder phase has been removed.

The present invention can be implemented for various types of cutting tools such as drills, end mills, replaceable milling inserts, replaceable turning inserts, metal saws, gear cutting tools, reamers, and taps. In particular, the present invention is suited for throw-away inserts, drills, and end mills. For drills and end mills, the present invention is used for solid drills and end mills, where the cutting section and the support are sintered or formed integrally, or for brazed drills and end mills, where the cutting section is brazed to the support, rather than throw-away (replaceable cutting edge) tools, where the cutting section and the support can be attached or removed. In the case of brazed tools, it is preferable for the coating layer to be formed using PVD, which has a relatively low film-forming temperature. For solid tools, the coating layer can be formed using PVD or CVD, which has a relatively high film-forming temperature.

The surface-coated cutting tool of the present invention as described above is equipped with a predetermined coating layer. As a result, superior lubricity is provided as well as superior wear resistance, peeling resistance, fracture resistance, and breakage resistance. Thus, superior cutting properties and extended tool life are provided even under usage environments involving harsh cutting conditions such as dry cutting, deep boring, cutting of workpieces that tend to weld easily, and other cutting operations such as high-speed, high-efficiency cutting where the cutting edge is exposed to high temperatures.

In particular, since the surface-coated cutting tool of the present invention is equipped with a predetermined TiCN film in the inner layer, both superior lubricity and superior wear resistance are provided, and tool life is extended with superior cutting characteristics even under the harsh usage environments described above.

DETAILED DESCRIPTION OF THE PREFERRED EMBODIMENTS

Figure 1:
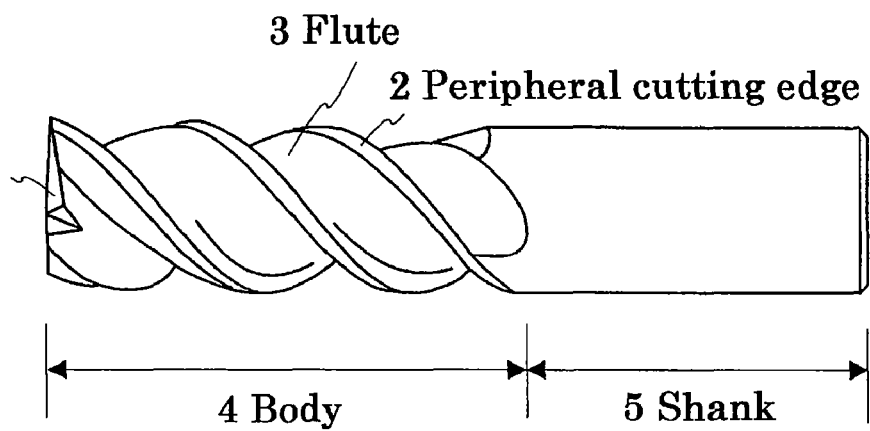
FIG. 1(A) is a simplified front-view drawing of an end mill.
FIG. 1(B) is a simplified front-view drawing of a drill.
Figure 1:
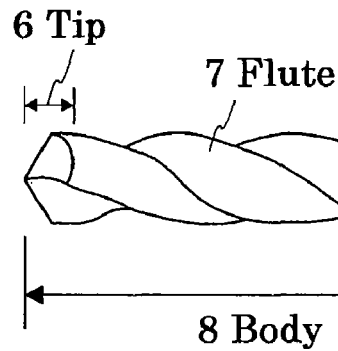

The embodiments of the present invention will be described.

FIRST EXAMPLE

Using a throw-away insert for turning as an example, the present invention will be described more specifically below.

TEST EXAMPLE 1-1

A powder with 86 percent by mass of WC, 8.0 percent by mass of Co, 2.0 percent by mass of TiC, 2.0 percent by mass of NbC, and 2.0 percent by mass of ZrC was prepared. The powder was wet mixed for 72 hours with a ball mill, dried, and then pressed into a green compact with a breaker structure. This green compact was heated for 1 hour in a vacuum atmosphere at 1420 deg C. in a sintering furnace, resulting in a sintered body. SiC brush honing and beveling were performed at the ridge line of the cutting edge of the obtained sintered body, resulting in an ISO SNMG120408 throw-away insert formed from WC-based cemented carbide.

A coating layer was formed on the substrate surface using thermal CVD, a chemical vapor deposition technique. In this test, starting from the substrate side, an inner layer was formed from TiN(0.5), TiCN(6), TiBN(0.5), κ-$Al_2O_3$(2) and an outermost layer was formed from AlN(3). The numbers in parentheses indicate film thickness in microns. Table 1 shows an example of film forming conditions for each film. Specifically, the composition of the reaction gas (percent by volume), the pressure applied when forming the film (kPa), and the film forming temperature (deg C.) are shown. Film thickness was controlled by controlling the film forming time. Test samples in which the AlN film at the outermost layer have different chlorine contents were prepared by varying the film forming conditions as shown in Table 1. Table 2 shows chlorine content at the outermost layer. Specifically, samples with more than 0 and no more than 0.5 atomic percent of chlorine, samples with more than 0.5 atomic percent of chlorine, and samples with no chlorine were prepared. Chlorine content was varied as shown in Table 1 by varying the proportion of hydrogen chloride (HCl) in the reaction gas. Also, depending on the amount of hydrogen chloride, the film forming pressure and the film forming temperature were varied as appropriate. Furthermore, the surface roughness at sites on the outermost layer near the ridge line of the cutting edge at areas that come into contact with the workpiece were studied for test samples containing more than 0 and no more than 0.5 atomic percent of chlorine in the outermost layer. Observation of the tool cross-sections showed that the Rmax for a reference length of 5 microns was no more than 1.3 microns for all samples. More specifically, the Rmax was 0.6 microns for Test Sample 1-2, for example. The chlorine content was measured using XPS (X-ray Photoelectron Spectroscopy), but composition can also be studied using micro-EDX (Energy Dispersive X-ray Spectroscopy) combined with a transmission electron microscope or using SIMS (Secondary Ion Mass Spectrometry). Also, the Knoop hardness for each of the layers in the test samples was studied, and it was found that in all cases the outermost AlN film was softer than the inner TiCN film layer.

TABLE 1

| Coating layer | Reaction gas composition (vol %) | Pressure (kPa) | Temperature (deg C.) |
|---|---|---|---|
| AlN *1 | $AlCl_3$: 1.0-5.0%, $NH_3$: 0.1-5.0%, $N_2$: 20-50%, HCl: 0.01-1.0%, $H_2$: rest | 4.0-80 | 750-980 |
| AlCN *1 | $AlCl_3$: 1.0-5.0%, $NH_3$: 0.1-5.0%, $N_2$: 20-50%, $CH_4$: 0.5-5.0%, HCl: 0.01-1.0%, $H_2$: rest | 4.0-80 | 750-980 |
| AlON *1 | $AlCl_3$: 1.0-5.0%, $NH_3$: 0.1-5.0%, $N_2$: 20-50%, $CO_2$: 0.2-3.0%, HCl: 0.01-1.0%, $H_2$: rest | 4.0-80 | 750-980 |
| AlN *2 | $AlCl_3$: 1.5%, $NH_3$: 1.0%, $N_2$: 40%, $H_2$: rest | 5.0 | 1000 |
| AlN *3 | $AlCl_3$: 1.5%, $NH_3$: 3.0%, $N_2$: 40%, HCl: 5.0%, $H_2$: rest | 13.3 | 950 |
| AlON *2 | $AlCl_3$: 1.5%, $NH_3$: 6.0%, $N_2$: 40%, $CO_2$: 1.0%, $H_2$: rest | 6.8 | 1100 |
| TiN | $TiCl_4$: 2.0%, $N_2$: 25%, $H_2$: rest | 13.3 | 950 |
| TiC | $TiCl_4$: 2.0%, $CN_4$: 5%, $H_2$: rest | 13.3 | 1050 |
| TiCN | $TiCl_4$: 2.0%, $CH_3CN$: 0.6%, $N_2$: 20%, $H_2$: rest | 6.7-80 | 800-950 |
| ZrCN | $ZrCl_4$: 1.0%, $CH_3CN$: 0.6%, $N_2$: 35%, $H_2$: rest | 6.7 | 890 |
| TiZrCN | $TiCl_4$: 1.5%, $ZrCl_4$: 1.0%, $CH_3CN$: 1.0%, $N_2$: 45%, $H_2$: rest | 6.7 | 975 |
| TiCNO | $TiCl_4$: 2.0%, $CO_2$: 2.5%, $N_2$: 8%, $H_2$: rest | 6.7 | 975 |
| TiBN | $TiCl_4$: 2.0%, $BCl_3$: 5.0%, $N_2$: 5.0%, $H_2$: rest | 13.3 | 950 |
| HfCN | $HfCl_4$: 1.0%, $CH_3CN$: 1.2%, $N_2$: 40%, $H_2$: rest | 6.7 | 1025 |
| α $Al_2O_3$ | $AlCl_3$: 2.0%, $H_2S$: 0.3%, $CO_2$: 5.0%, $H_2$: rest | 6.7 | 1050 |
| κ $Al_2O_3$ | $AlCl_3$: 2.0%, $CO_2$: 5.0%, CO: 0.5%, $H_2$: rest | 6.7 | 1000 |
| $ZrO_2$ | $ZrCl_4$: 2.0%, $CO_2$: 7.0%, $H_2$: rest | 6.7 | 1050 |
| $Al_2O_3$—$ZrO_2$ | $AlCl_3$: 1.5%, $ZrCl_4$: 0.3%, $CO_2$: 9.0%, $H_2$: rest | 13.3 | 1070 |

*1 Chlorine content is more than 0 and no more than 0.5 atomic percent
*2 No chlorine
*3 Chlorine content is more than 0.5 atomic percent

TABLE 2

| Test Sample No. | Outermost layer | Chlorine content (atomic %) |
|---|---|---|
| 1-1 | AlN *1 | 0.02 |
| 1-2 | AlN *1 | 0.15 |
| 1-3 | AlN *1 | 0.49 |
| 1-4 | AlN *2 | 0 |
| 1-5 | AlN *3 | 0.90 |

Using the surface-coated throw-away inserts with the outermost layers as shown in Table 2, cutting operations were performed using the cutting conditions shown in Table 3. The cutting time involved in reaching the tool life was measured. In a peeling resistance test, cutting operations were repeated, with the end of tool life defined to be when flank face wear due to film peeling was at least 0.3 mm. In a fracturing resistance test, intermittent cutting was performed, with the end of tool life defined to be when a fracture occurred. The results of the tests are shown in Table 4.

TABLE 3

| | Peeling resistance test | Fracture resistance test |
|---|---|---|
| Workpiece | S15C rod | S45C fluted rod |
| | 3-sec repetition test | |
| Speed | V = 300 m/min | V = 260 m/min |
| Feed | f = 0.3 mm/rev. | f = 0.2 mm/rev. |
| Cutting depth | d = 1.0 mm | d = 1.5 mm |
| Cutting oil | None | None |

TABLE 4

| Test sample No. | Cutting time (min) | |
|---|---|---|
| | Peeling resistance test | Fracture resistance test |
| 1-1 | 40 | 23 |
| 1-2 | 63 | 30 |
| 1-3 | 52 | 21 |
| 1-4 | 10 | 7 |
| 1-5 | 9 | 4 |

Based on the results, in the Test Samples 1-1 through 1-3, which have aluminum nitride layers with more than 0 and not more than 0.5 atomic percent of chlorine on the outermost layer as shown in Table 4, superior lubricity and improved welding resistance was observed even in environments where the cutting edge reaches high temperature, such as in dry cutting and intermittent cutting. This provided superior peeling resistance as well as superior fracturing resistance due to reduced cutting force. Also, these Test Samples 1-1-1-3 showed reduced wear, indicating superior wear resistance. Based on these factors, it can be seen that the Test Samples 1-1-1-3 provide longer cutting times and extended tool life.

TEST EXAMPLE 1-2

A cemented carbide substrate similar to the one used in the Test Example 1-1 was prepared. Thermal CVD was performed on the surface of the obtained substrate to form a coating layer with the film forming conditions (gas composition, pressure, temperature) shown in Table 1. Table 5 shows the composition, film thicknesses, and film thickness of the entire coating layer (total film thickness). In Table 5, the films are indicated sequentially as the first film, the second film, and the like starting from the film closest to the substrate.

TABLE 5

| Test sample No. | First film Type | First film Thickness | Second film Type | Second film Thickness | Third film Type | Third film Thickness | Fourth film Type | Fourth film Thickness | Fifth film Type | Fifth film Thickness | Sixth film Type | Sixth film Thickness | Total Thickness μm | Cutting time (min) |
|---|---|---|---|---|---|---|---|---|---|---|---|---|---|---|
| 2-1 | TiCN | 5.0 | AlN*1 | 2.0 | | | | | | | | | 7.0 | 20 |
| 2-2 | TiN | 0.5 | ZrCN | 7.0 | AlN*1 | 0.5 | | | | | | | 8.0 | 31 |
| 2-3 | TiN | 1.0 | TiCN | 4.5 | TiC | 1.5 | TiCNO | 1.0 | κ Al2O3 | 3.0 | AlCN*1 | 5.0 | 16.0 | 35 |
| 2-4 | TiN | 0.3 | TiCN | 6.5 | TiBN | 0.5 | κ Al2O3 | 1.5 | TiN | 0.3 | AlN*1 | 3.0 | 12.1 | 27 |
| 2-5 | TiN | 0.5 | TiCN | 20.0 | Al2O3—ZrO2 | 5.0 | AlN*1 | 2.0 | | | | | 27.5 | 37 |
| 2-6 | TiCN | 3.0 | TiZrCN | 5.0 | ZrO2 | 2.3 | Al2O3—ZrO2 | 2.5 | AlON*1 | 1.7 | | | 14.5 | 28 |
| 2-7 | TiCN | 3.2 | TiN | 0.5 | HfCN | 4.3 | AlCN*1 | 2.5 | | | | | 10.5 | 21 |
| 2-8 | TiN | 0.5 | TiBN | 1.3 | α Al2O3 | 5.0 | AlN*1 | 0.05 | | | | | 6.85 | 25 |
| 2-9 | HfCN | 3.5 | α Al2O3 | 1.5 | TiCNO | 2.3 | TiCN | 6.5 | TiN | 0.7 | AlCN*1 | 0.7 | 15.2 | 30 |
| 2-10 | TiN | 5.0 | TiZrCN | 14.0 | AlCN*1 | 9.0 | | | | | | | 28 | 32 |
| 2-11 | TiN | 0.5 | TiCN | 4.5 | AlCN*1 | 0.5 | AlN*1 | 0.5 | | | | | 6.0 | 23 |
| 2-12 | TiN | 0.5 | TiCNO | 2.0 | TiCN | 6.0 | TiBN | 0.5 | κ Al2O3 | 1.5 | AlCN*1 | 0.7 | 11.2 | 25 |
| 2-13 | HfCN | 4.0 | TiN | 1.0 | | | | | | | | | 5.0 | 4 |
| 2-14 | TiN | 0.5 | TiCN | 5.0 | TiCNO | 0.5 | ZrO2 | 2.0 | TiCN | 0.1 | TiN | 2.0 | 10.1 | 6 |
| 2-15 | TiN | 0.5 | AlON*1 | 2.0 | α Al2O3 | 3.0 | TiN | 1.5 | | | | | 7.0 | 6 |
| 2-16 | ZrCN | 0.07 | AlN*1 | 0.02 | | | | | | | | | 0.09 | 8 |
| 2-17 | TiN | 0.5 | ZrCN | 4.0 | AlN*1 | 0.02 | | | | | | | 4.52 | 11 |
| 2-18 | TiN | 0.5 | TiCN | 3.0 | TiCNO | 11.0 | α Al2O3 | 3.5 | Al2O3—ZrO2 | 7.0 | AlCN*1 | 10.0 | 35.0 | 7 |
| 2-19 | TiCN | 4.0 | TiBN | 2.0 | ZrO2 | 2.0 | AlCN*1 | 8.0 | | | | | 16.0 | 13 |
| 2-20 | TiN | 1.0 | ZrCN | 4.0 | AlON*2 | 1.3 | | | | | | | 6.3 | 5 |
| 2-21 | AlN*1 | 5.0 | | | | | | | | | | | 5.0 | 3 |
| 2-22 | TiN | 3.0 | AlCN*1 | 1.0 | | | | | | | | | 4.0 | 11 |
| 2-23 | TiZrCN | 10.0 | AlCN*1 | 4.0 | | | | | | | | | 14.0 | 10 |

Repeated cutting was performed under the cutting conditions shown below using the surface-coated throw-away inserts with the coating layers shown in Table 5. The cutting time involved in reaching the tool life was measured. The end of tool life was defined to be when flank face wear was at least 0.3 mm. Table 5 shows the results from the test as well.

Workpiece: 15-second repeated wear resistance test with SCM435 round rod
Speed: V=180 m/min
Feed: f=0.2 mm/rev.
Depth of cut: d=1.5 mm
Cutting oil: none As a result, it was found as shown in Table 5 that, compared to the other test samples, Test Samples 2-1-2-12, 2-16-2-19, 2-22, and 2-23, which had an aluminum nitride film containing a predetermined amount of chlorine as the outermost layer and films with predetermined compositions as the inner layers, provided superior lubricity and superior wear resistance.

Also, the results shown in Table 5 indicate that it is preferable for the outermost layer to be at least 0.03 microns and for the total film thickness to be at least 0.1 microns and no more than 30 microns. Furthermore, it can be seen that it is preferable for the outermost layer to have no more than ½ the total thickness of the inner layer.

The inserts from the test sample 2-1-2-23 were all cut and the surface roughness relative to a 5 micron reference length was measured for the area of the outermost layer near the ridge line of the cutting edge that comes into contact with the workpiece. As a result, it was found that Rmax was no more than 1.3 microns for all inserts except the Test Sample 2-23, while the Rmax of the Test Sample 2-23 was 1.7 microns. For the Test Sample 2-23, a #1500 diamond paste was used to polish the area of the outermost layer near the ridge line of the cutting edge that comes into contact with the workpiece. When the method described above was used to measure surface roughness after polishing, Rmax was 0.52 microns. When a cutting test was performed under the same cutting conditions using the polished insert, the tool life was 22 min. This is believed to be caused by a reduction in the cutting force resulting from less roughness at the area of the outermost layer near the ridge line of the cutting edge that comes into contact with the workpiece. When the surface roughness of the Test Sample 2-3 was measured as described above, the Rmax was 0.76 microns, but when the cutting edge was polished in the same manner, the tool life after another cutting operation was found to be significantly improved, at 45 min.

Furthermore, a coating film was formed on the Test Sample 2-22 making the film hardness of the inner layer lower than that of the outermost layer. Then, the hardnesses of the films forming the coating layers of the Test Samples 2-1-2-20, 2-22, and 2-23 were measured. The film hardness of the outermost layer was lower than that of at least one film of the inner layer for all the inserts, with the exception of Test Sample 2-22. With Test Sample 2-22, the film hardness of the outermost layer was higher than that of the inner layer. Based on this, it is believed that the cutting efficiency of Test Sample 2-22 was reduced compared to Test Samples 2-1-2-12.

TEST EXAMPLE 1-2'

Surface-coated inserts similar to those of the Test Samples 2-1-2-23 were prepared and cutting tests were performed under the cutting conditions described below. Crater wear (area: mm$^2$) was then measured for a predetermined cutting length (500 m).

Workpiece: S50C
Speed: V=250 m/min
Feed: f=0.3 mm/rev.
Depth of cut: d=1.5 mm
Cutting oil: none The results showed that the Test Samples 2-1-2-12, 2-16-2-19, 2-22, and 2-23 had less crater wear compared to the other samples. For example, the results for the Test Samples 2-4, 2-5, and 2-6 were 0.45 mm$^2$, 0.39 mm$^2$, and 0.44 mm$^2$, respectively.

TEST EXAMPLE 1-3

Surface-coated inserts were prepared using the substrate described below with a widely known PVD method used to form a coating layer having a composition similar to that of the Test Samples 2-2, 2-13 from Table 5. For the insert with a coating layer having a composition similar to that of the Test Sample 2-2, the surface-coated insert was formed by adding chlorine to the outermost layer using ion implantation after the coating layer was formed. Cutting tests with cutting conditions similar to those of Test Example 1-2 were performed using these surface-coated inserts. The test samples formed with the coating layer from the Test Sample 2-2 all had a chlorine content of 0.2 atomic percent on the outermost layer.
1. JIS standard: P20 cermet cutting insert (T1200A, Sumitomo Electric Hardmetal Corp. Ltd.)
2. Ceramic cutting insert (W80, Sumitomo Electric Hardmetal Corp. Ltd.)
3. Silicon nitride cutting insert (NS260, Sumitomo Electric Hardmetal Corp. Ltd.)
4. Cubic boron nitride cutting insert (BN250, Sumitomo Electric Hardmetal Corp. Ltd.)

The results showed that all the inserts with the coating layer having the composition from Test Sample 2-2 provided a tool life of at least twice that of conventional inserts with the coating layer having the composition from Test Sample 2-13.

TEST EXAMPLE 1-4

A powder with 86 percent by mass of WC, 8.0 percent by mass of Co, 2.0 percent by mass of TiC, 2.0 percent by mass of NbC, and 2.0 percent by mass of ZrC was prepared. The powder was wet mixed for 72 hours with a ball mill, dried, and then pressed into a green compact with a breaker structure. This green compact was heated for 1 hour in a vacuum atmosphere at 1420 deg C. in a sintering furnace, resulting in a sintered body. SiC brush honing and beveling were performed at the ridge line of the cutting edge of the obtained sintered body, resulting in an ISO SNMG120408 throw-away insert formed from WC-based cemented carbide.

A coating layer was formed on the substrate surface using thermal CVD, a chemical vapor deposition technique. In this test, starting from the substrate side an inner layer was formed from TiN(0.5), columnar structure TiCN(6), TiBN(0.5), κ-Al$_2$O$_3$(2) and an outermost layer was formed from AlN(3). The numbers in parentheses indicate film thickness in microns. Table 6 shows an example of film forming conditions for each film. Specifically, the composition of the reaction gas (percent by volume), the pressure applied when forming the film (kPa), and the film forming temperature (deg C.) are shown. Film thickness was controlled by controlling the film forming time. In this test, the TiCN film was grown so that it has a columnar structure with an aspect ratio of 4.2 and so that the (311) plane has the maximum index of orientation TC. More specifically, the TiN film formation conditions (gas composition, pressure, temperature) were set up so that the reaction gas was CH$_3$CN, the temperature was 900 deg C., the pressure was 8 kPa, and the surface roughness Rmax (5 microns reference length) of the TiN film formed below the TiCN film was 0.1 microns. Then, the film forming conditions were varied as shown in Table 6 to form AlN films on the outermost layer with different chlorine content. Table 7 shows chlorine content on the outermost layer. More specifically, test samples were prepared with more than 0 and no more than 0.5 atomic percent chlorine on the outermost layer, more than 0.5 atomic percent chlorine, and no chlorine. The chlorine content was varied by varying the proportion of hydrogen chloride (HCl) in the reaction gas as shown in Table 6. Also, depending on the amount of hydrogen chloride, the film forming pressure and the film forming temperature were varied as appropriate. Furthermore, the surface roughness at sites on the outermost layer near the ridge line of the cutting edge at areas that come into contact with the workpiece were studied for test samples containing more than 0 and no more than 0.5 atomic percent of chlorine in the outermost layer. Observation of the tool cross-sections showed that the Rmax for a reference length of 5 microns was no more than 1.3 microns for all samples. More specifically, the Rmax was 0.6 microns for Test Sample 3-2, for example. The chlorine content was measured using XPS (X-ray Photoelectron Spectroscopy), but composition can also be studied using micro-EDX (Energy Dispersive X-ray Spectroscopy) combined with a transmission electron microscope or using SIMS (Secondary Ion Mass Spectrometry).

TABLE 6

| Coating layer | Reaction gas composition (vol %) | Pressure (kPa) | Temperature (deg C.) |
|---|---|---|---|
| AlN [*1] | $AlCl_3$: 1.0-5.0%, $NH_3$: 0.1-5.0%, $N_2$: 20-50%, HCl: 0.01-1.0%, $H_2$: rest | 4.0-80 | 750-980 |
| AlCN [*1] | $AlCl_3$: 1.0-5.0%, $NH_3$: 0.1-5.0%, $N_2$: 20-50%, $CH_4$: 0.5-5.0%, HCl: 0.01-1.0%, $H_2$: rest | 4.0-80 | 750-980 |
| AlON [*1] | $AlCl_3$: 1.0-5.0%, $NH_3$: 0.1-5.0%, $N_2$: 20-50%, $CO_2$: 0.2-3.0%, HCl: 0.01-1.0%, $H_2$: rest | 4.0-80 | 750-980 |
| AlN [*2] | $AlCl_3$: 1.5%, $NH_3$: 1.0%, $N_2$: 40%, $H_2$: rest | 5.0 | 1000 |
| AlN [*3] | $AlCl_3$: 1.5%, $NH_3$: 3.0%, $N_2$: 40%, HCl: 5.0%, $H_2$: rest | 13.3 | 950 |
| AlON [*2] | $AlCl_3$: 1.5%, $NH_3$: 6.0%, $N_2$: 40%, $CO_2$: 1.0%, $H_2$: rest | 6.8 | 1100 |
| TiN | $TiCl_4$: 2.0%, $N_2$: 25%, $H_2$: rest | 13.3 | 950 |
| TiC | $TiCl_4$: 2.0%, $CN_4$: 5%, $H_2$: rest | 13.3 | 1050 |
| granular TiCN | $TiCl_4$: 4.0%, $CH_4$: 4.0%, $N_2$: 20%, $H_2$: rest | 14 | 1020 |
| columnar TiCN | $TiCl_4$: 3.0%, $CH_3CN$: 0.6%, $N_2$: 20%, $H_2$: rest | 4.0-80 | 800-950 |
| ZrCN | $ZrCl_4$: 1.0%, $CH_3CN$: 0.6%, $N_2$: 35%, $H_2$: rest | 6.7 | 890 |
| TiZrCN | $TiCl_4$: 1.5%, $ZrCl_4$: 1.0%, $CH_3CN$: 1.0%, $N_2$: 45%, $H_2$: rest | 6.7 | 975 |
| TiCNO | $TiCl_4$: 2.0%, $CO_2$: 2.5%, $N_2$: 8%, $H_2$: rest | 6.7 | 975 |
| TiBN | $TiCl_4$: 2.0%, $BCl_3$: 5.0%, $N_2$: 5.0%, $H_2$: rest | 13.3 | 950 |
| HfCN | $HfCl_4$: 1.0%, $CH_3CN$: 1.2%, $N_2$: 40%, $H_2$: rest | 6.7 | 1025 |
| $\alpha Al_2O_3$ | $AlCl_3$: 2.0%, $H_2S$: 0.3%, $CO_2$: 5.0%, $H_2$: rest | 6.7 | 1050 |
| $\kappa Al_2O_3$ | $AlCl_3$: 2.0%, $CO_2$: 5.0%, CO: 0.5%, $H_2$: rest | 6.7 | 1000 |
| $ZrO_2$ | $ZrCl_4$: 2.0%, $CO_2$: 7.0%, $H_2$: rest | 6.7 | 1050 |

TABLE 6-continued

| Coating layer | Reaction gas composition (vol %) | Pressure (kPa) | Temperature (deg C.) |
|---|---|---|---|
| $Al_2O_3$—$ZrO_2$ | $AlCl_3$: 1.5%, $ZrCl_4$: 0.3%, $CO_2$: 9.0%, $H_2$: rest | 13.3 | 1070 |

[*1] Chlorine content is more than 0 and no more than 0.5 atomic percent
[*2] No chlorine
[*3] Chlorine content is more than 0.5 atomic percent

TABLE 7

| Test sample No. | Outermost layer | Chlorine content (atomic percent) |
|---|---|---|
| 3-1 | AlN [*1] | 0.02 |
| 3-2 | AlN [*1] | 0.15 |
| 3-3 | AlN [*1] | 0.49 |
| 3-4 | AlN [*2] | 0 |
| 3-5 | AlN [*3] | 0.90 |

Using the surface-coated throw-away inserts with the outermost layers as shown in Table 7, continuous cutting operations were performed using the cutting conditions shown in Table 8. The cutting time involved in reaching the tool life was measured. In a peeling resistance test, cutting operations were repeated, with the end of tool life defined to be when flank face wear due to film peeling was at least 0.3 mm. In a wear resistance test, tool life was defined to be when the flank face wear was at least 0.3 mm. The results of the tests are shown in Table 9.

TABLE 8

| | Peeling resistance test | Wear resistance test |
|---|---|---|
| Workpiece | S15C rod 3 sec repetition test | S45C rod |
| Speed | V = 300 m/min | V = 260 m/min |
| Feed | f = 0.3 mm/rev. | f = 0.2 mm/rev. |
| Cutting depth | d = 1.0 mm | d = 1.5 mm |
| Cutting oil | None | None |

TABLE 9

| Test Sample No. | Cutting time (min) | |
|---|---|---|
| | Peeling resistance test | Wear resistance test |
| 3-1 | 42 | 24 |
| 3-2 | 60 | 31 |
| 3-3 | 51 | 21 |
| 3-4 | 12 | 6 |
| 3-5 | 10 | 5 |

Based on the results, in the Test Samples 3-1 through 3-3, which have aluminum nitride layers with more than 0 and not more than 0.5 atomic percent of chlorine on the outermost layer as shown in Table 9, superior lubricity and improved welding resistance was observed even in dry cutting. This improved welding resistance and provided superior peeling resistance by reducing cutting force. Also, since a predetermined TiCN film is used in the inner layer, the Test Samples 3-1-3-3 also provide superior wear resistance. Furthermore, chipping did not take place with these Test Samples 3-1-3-3. Thus superior chipping resistance and fracturing resistance are provided. Based on these factors, it can be seen that the Test Samples 3-1-3-3 provide longer cutting times and extended tool life.

TEST EXAMPLE 1-5

A cemented carbide substrate similar to the one used in the Test Example 1-4 was prepared. Thermal CVD was performed on the surface of the obtained substrate to form a coating layer with the film forming conditions (gas composition, pressure, temperature) shown in Table 6. In this test, the following layers were formed, starting from the substrate side: TiN(0.5), columnar structure TiCN(4) or granular structure TiCN(4), TiBN(0.5), $Al_2O_3$—$ZrO_2$(2) and an outermost layer formed from AlN*[1](3) (Test Sample 3-3 from Table 7). The numbers in parentheses indicate film thickness in microns. Film thickness was controlled by controlling the film forming time. In this test, the aspect ratio and the face with the maximum index of orientation of the columnar structure TiCN film are varied, as shown in Table 6, by varying the film forming pressure and temperature as well as by varying the surface roughness and gas conditions for the TiN film formed below the TiCN film. More specifically, the aspect ratio of the TiCN film was set to at least 3 by using $CH_3CN$ as the reaction gas, with the gas temperature set to 920 deg C. and the pressure set to 6 kPa and the $CH_3CN$ reaction gas being introduced gradually. Also, if the TiCN film maximum index of orientation is to be TC(422), for example, the surface roughness Rmax (5 microns reference length) of the substrate is set to 0.09 microns and the TiCN film is formed while adjusting the aspect ratio outward from the substrate (away from the substrate). Furthermore, for all the test samples, the surface of the outermost layer was polished after forming the outermost layer so that the section of the outermost layer around the ridge line of the cutting edge that comes into contact with the workpiece had a surface roughness Rmax of 0.4 microns for 5 microns reference length when measured by observing tool cross-sections. Table 10 shows TiCN film structure, aspect ratio, and the face with the maximum index of orientation TC.

TABLE 10

| Test sample No. | Inner layer TiCN film | | | Cutting time (min) Wear resistance test |
|---|---|---|---|---|
| | Structure | Aspect ratio | Face with maximum TC | |
| 4-1 | Columnar | 5.2 | 311 | 21 |
| 4-2 | Columnar | 6.6 | 422 | 25 |
| 4-3 | Columnar | 3.1 | 220 | 19 |
| 4-4 | Columnar | 2.3 | 220 | 4 |
| 4-5 | Columnar | 3.5 | 420 | 5 |
| 4-6 | Granular | — | 311 | 1 |

Using the surface-coated throw-away inserts with TiCN film inner layers as shown in Table 10, continuous cutting operations were performed using the cutting conditions described below. The cutting time involved in reaching the tool life was measured. The end of tool life was defined to be when flank face wear was at least 0.3 mm. Table 10 shows the results from the test as well.

Workpiece: wear resistance test with SUS rod
Speed: V=200 m/min
Feed: f=0.2 mm/rev.
Depth of cut: d=1.5 mm
Cutting oil: none The results show that with a TiCN film as an inner layer as in Table 10, a columnar structure provides superior wear resistance. More specifically, with Test Samples 4-1-4-3, which are formed with columnar structure TiCN film at the inner layer with an aspect ratio of at least 3 and a maximum index of orientation of TC(311), TC(220), or TC(422), wear resistance is especially superior and tool life is longer, even when dry cutting. The longer tool life is believed to be because of the superior lubricity of the outermost layer and the use of a predetermined TiCN film with superior wear resistance as the inner layer.

TEST EXAMPLE 1-6

A cemented carbide substrate similar to the one used in the Test Example 1-4 was prepared. Thermal CVD was performed on the surface of the obtained substrate to form a coating layer with the film forming conditions (gas composition, pressure, temperature) shown in Table 6. In this test, the film forming conditions were controlled so that columnar structure TiCN films had an aspect ratio of at least 3 and the maximum index of orientation was TC(311), TC(220), or TC(422). Table 11 shows the composition, film thicknesses, and the film thickness of the entire coating layer (total film thickness). In Table 11, the films are indicated sequentially as the first film, the second film, and the like starting from the film closest to the substrate.

TABLE 11

| Test Sample No. | First film | | Second film | | Third film | | Fourth film | | Fifth film | | Sixth film | | Total Thickness μm | Cutting time min |
|---|---|---|---|---|---|---|---|---|---|---|---|---|---|---|
| | Type | Thickness | Type | Thickness | Type | Thickness | Type | Thickness | Type | Thickness | Type | Thickness | | |
| 5-1 | columnar TiCN | 5.0 | AlN*[1] | 2.0 | | | | | | | | | 7.0 | 21 |
| 5-2 | columnar TiCN | 0.5 | ZrCN | 7.0 | AlN*[1] | 0.5 | | | | | | | 8.0 | 31 |
| 5-3 | TiN | 1.0 | columnar TiCN | 4.5 | TiC | 1.5 | TiCNO | 1.0 | κ $Al_2O_3$ | 3.0 | AlCN*[1] | 5.0 | 16.0 | 37 |

TABLE 11-continued

| Test Sample No. | First film Type | First film Thickness | Second film Type | Second film Thickness | Third film Type | Third film Thickness | Fourth film Type | Fourth film Thickness | Fifth film Type | Fifth film Thickness | Sixth film Type | Sixth film Thickness | Total Thickness μm | Cutting time min |
|---|---|---|---|---|---|---|---|---|---|---|---|---|---|---|
| 5-4 | TiN | 0.3 | columnar TiCN | 6.5 | TiBN | 0.5 | κAl$_2$O$_3$ | 1.5 | TiN | 0.3 | AlN*$^1$ | 3.0 | 12.1 | 27 |
| 5-5 | TiN | 0.5 | columnar TiCN | 20.0 | Al$_2$O$_3$—ZrO$_2$ | 5.0 | AlN*$^1$ | 2.0 | | | | | 27.5 | 35 |
| 5-6 | columnar TiCN | 3.0 | TiZrCN | 5.0 | ZrO$_2$ | 2.3 | Al$_2$O$_3$—ZrO$_2$ | 2.5 | AlON*$^1$ | 1.7 | | | 14.5 | 26 |
| 5-7 | columnar TiCN | 3.2 | TiN | 0.5 | HfCN | 4.3 | AlCN*$^1$ | 2.5 | | | | | 10.5 | 23 |
| 5-8 | columnar TiCN | 0.5 | TiBN | 1.3 | αAl$_2$O$_3$ | 5.0 | AlN*$^1$ | 0.05 | | | | | 6.85 | 26 |
| 5-9 | HfCN | 3.5 | αAl$_2$O$_3$ | 1.5 | TiCNO | 2.3 | columnar TiCN | 6.5 | TiN | 0.7 | AlCN*$^1$ | 0.7 | 15.2 | 32 |
| 5-10 | columnar TiCN | 5.0 | TiZrCN | 14.0 | AlCN*$^1$ | 9.0 | | | | | | | 28 | 32 |
| 5-11 | TiN | 0.5 | columnar TiCN | 4.5 | AlCN*$^1$ | 0.5 | AlN*$^1$ | 0.5 | | | | | 6.0 | 25 |
| 5-12 | TiN | 0.5 | TiCNO | 2.0 | columnar TiCN | 6.0 | TiBN | 0.5 | κAl$_2$O$_3$ | 1.5 | AlCN*$^1$ | 0.7 | 11.2 | 23 |
| 5-13 | columnar TiCN | 2.0 | HfCN | 2.0 | TiN | 1.0 | | | | | | | 5.0 | 6 |
| 5-14 | TiN | 0.5 | columnar TiCN | 5.0 | TiCNO | 0.5 | ZrO$_2$ | 2.0 | columnar TiCN | 0.1 | TiN | 2.0 | 10.1 | 7 |
| 5-15 | columnar TiCN | 0.5 | AlON*$^1$ | 2.0 | αAl$_2$O$_3$ | 3.0 | TiN | 1.5 | | | | | 7.0 | 5 |
| 5-16 | columnar TiCN | 0.07 | AlN*$^1$ | 0.02 | | | | | | | | | 0.09 | 8 |
| 5-17 | columnar TiCN | 0.5 | ZrCN | 4.0 | AlN*$^1$ | 0.02 | | | | | | | 4.52 | 11 |
| 5-18 | TiN | 0.5 | columnar TiCN | 3.0 | TiCNO | 11.0 | αAl$_2$O$_3$ | 3.5 | Al$_2$O$_3$—ZrO$_2$ | 7.0 | AlCN*$^1$ | 10.0 | 35.0 | 8 |
| 5-19 | columnar TiCN | 4.0 | TiBN | 2.0 | ZrO$_2$ | 2.0 | AlCN*$^1$ | 8.0 | | | | | 16.0 | 14 |
| 5-20 | TiN | 0.2 | columnar TiCN | 0.8 | ZrCN | 4.0 | AlON*$^2$ | 1.3 | | | | | 6.3 | 7 |
| 5-21 | columnar TiCN | 10.0 | AlCN*$^1$ | 4.0 | | | | | | | | | 14.0 | 10 |

Using the surface-coated throw-away inserts with coating layers as shown in Table 11, continuous cutting operations were performed using the cutting conditions described below. The cutting time involved in reaching the tool life was measured. The end of tool life was defined to be when flank face wear was at least 0.3 mm. Table 11 shows the results from the test as well.

Workpiece: 15-second repetitive wear resistance test with SCM435 rod
Speed: V=180 m/min
Feed: f=0.2 mm/rev.
Depth of cut: d=1.5 mm
Cutting oil: none As a result, it was found as shown in Table 11 that, compared to the other test samples, Test Samples 5-1-5-12, 5-16-5-19, 5-21, which had an aluminum nitride film containing a predetermined amount of chlorine as the outermost layer and a columnar structure TiCN film inner layer with an aspect ratio of at least 3 and a maximum index of orientation of TC(311), TC(220), or TC(422), provided superior lubricity and superior wear resistance.

Also, the results shown in Table 11 indicate that it is preferable for the outermost layer to be at least 0.03 microns and for the total film thickness to be at least 0.1 microns and no more than 30 microns. Furthermore, it can be seen that it is preferable for the outermost layer to have no more than ½ the total thickness of the inner layer.

The inserts from the test sample 5-1-5-21 were all cut and the surface roughness relative to a 5 micron reference length was measured for the area of the outermost layer near the ridge line of the cutting edge that comes into contact with the workpiece. As a result, it was found that Rmax was no more than 1.3 microns for all inserts except Test Sample 5-21, while the Rmax of the Test Sample 5-21 was 1.7 microns. For Test Sample 5-21, a #1500 diamond paste was used to polish the area of the outermost layer near the ridge line of the cutting edge that comes into contact with the workpiece. When the method described above was used to measure surface roughness after polishing, Rmax was 0.52 microns. When a cutting test was performed under the same cutting conditions using the polished insert, the tool life was 24 min. This is believed to be caused by a reduction in the cutting force resulting from less roughness at the area of the outermost layer near the ridge line of the cutting edge that comes into contact with the workpiece. When the surface roughness of Test Sample 5-3 was measured as described above, the Rmax was 0.76 microns, but when the cutting edge was polished in the same manner, the tool life after another cutting operation was found to be significantly improved, at 48 min.

TEST EXAMPLE 1-6'

Surface-coated inserts similar to those of Test Samples 5-1-5-21 were prepared and cutting tests were performed under the cutting conditions described below. Crater wear (area: $mm^2$) was then measured for a predetermined cutting length (500 m).

Workpiece: S50C
Speed: V=250 m/min
Feed: f=0.3 mm/rev.
Depth of cut: d=1.5 mm
Cutting oil: none The results showed that Test Samples 5-1-5-12, 5-16-5-19, and 5-21 had less crater wear compared to the other samples. For example, the results for Test Samples 5-4, 5-5, and 5-6 were 0.3 $mm^2$, 0.27 $mm^2$, and 0.29 $mm^2$, respectively.

TEST EXAMPLE 1-7

Using the substrate described below, a coating film having a composition similar to that of Test Sample 5-2 from Table 11 was formed using a widely known PVD method. Surface-coated inserts were formed by adding chlorine to the outermost layer using ion implantation after the coating layer was formed. Cutting tests were performed under cutting conditions similar to those of Test Example 1-6.

The chlorine content of the outermost layer was 0.18 atomic percent in all cases.

1. JIS standard: P20 cermet cutting insert (T1200A, Sumitomo Electric Hardmetal Corp. Ltd.)
2. Ceramic cutting insert (W80, Sumitomo Electric Hardmetal Corp. Ltd.)
3. Silicon nitride cutting insert (NS260, Sumitomo Electric Hardmetal Corp. Ltd.)
4. Cubic boron nitride cutting insert (BN250, Sumitomo Electric Hardmetal Corp. Ltd.)

The results indicated that all the coated inserts provided superior lubricity and wear resistance.

Based on this, it can be seen that tool life can be improved in the same manner as when a cemented carbide is used as described above.

SECOND EXAMPLE

The present invention will be described in more detail, using end mills as an example.

TEST EXAMPLE 2-1

Two-edge square end mill substrates (solid end mills) formed from cemented carbide corresponding to JIS Z20 (10 mm diameter) were prepared. Thermal CVD, which is a chemical vapor deposition technique, was performed to form a coating layer on the substrate at the surface of the areas (body) associated with cutting. In this test, the following layers were formed, starting from the substrate side: an inner layer formed from TiN(0.5), TiCN(4), TiBN(0.5), $\kappa$-$Al_2O_3$ (1) and an outermost layer formed from AlN (1.5). The numbers in parentheses indicate film thickness in microns. Table 12 shows an example of film forming conditions for each film. Specifically, the composition of the reaction gas (percent by volume), the pressure applied when forming the film (kPa), and the film forming temperature (deg C.) are shown. Film thickness was controlled by controlling the film forming time. Test samples in which the AlN film at the outermost layer have different chlorine contents were prepared by varying the film forming conditions as shown in Table 12. Table 13 shows chlorine content at the outermost layer. Specifically, samples with more than 0 and no more than 0.5 atomic percent of chlorine, samples with more than 0.5 atomic percent of chlorine, and samples with no chlorine in the outermost layer were prepared. Chlorine content was varied as shown in Table 12 by varying the proportion of hydrogen chloride (HCl) in the reaction gas. Also, depending on the amount of hydrogen chloride, the film forming pressure and the film forming temperature were varied as appropriate. Furthermore, the surface roughness at sites on the outermost layer near the ridge line of the cutting edge at areas that come into contact with the workpiece were studied for test samples containing more than 0 and no more than 0.5 atomic percent of chlorine in the outermost layer. Observation of the tool cross-sections showed that the Rmax for a reference length of 5 microns was no more than 1.3 microns for all samples. More specifically, the Rmax was 0.6 microns for Test Sample 6-2, for example. The chlorine content was measured using XPS (X-ray Photoelectron Spectroscopy), but composition can also be studied using micro-EDX (Energy Dispersive X-ray Spectroscopy) combined with a transmission electron microscope or using SIMS (Secondary Ion Mass Spectrometry). Also, the Knoop hardness for each of the layers in the test samples was studied, and it was found that in all cases the outermost AlN film was softer than the inner TiCN film layer.

TABLE 12

| Coating layer | Reaction gas composition (vol %) | Pressure (kPa) | Temperature (deg C.) |
|---|---|---|---|
| AlN *[1] | $AlCl_3$: 1.0-5.0%, $NH_3$: 0.1-5.0%, $N_2$: 20-50%, HCl: 0.01-1.0%, $H_2$: rest | 4.0-80 | 750-980 |
| AlCN *[1] | $AlCl_3$: 1.0-5.0%, $NH_3$: 0.1-5.0%, $N_2$: 20-50%, $CH_4$: 0.5-5.0%, HCl: 0.01-1.0%, $H_2$: rest | 4.0-80 | 750-980 |

TABLE 12-continued

| Coating layer | Reaction gas composition (vol %) | Pressure (kPa) | Temperature (deg C.) |
|---|---|---|---|
| AlON *1 | $AlCl_3$: 1.0-5.0%, $NH_3$: 0.1-5.0%, $N_2$: 20-50%, $CO_2$: 0.2-3.0%, HCl: 0.01-1.0%, $H_2$: rest | 4.0-80 | 750-980 |
| AlN *2 | $AlCl_3$: 1.5%, $NH_3$: 1.0%, $N_2$: 40%, $H_2$: rest | 5.0 | 1000 |
| AlN *3 | $AlCl_3$: 1.5%, $NH_3$: 3.0%, $N_2$: 40%, HCl: 5.0%, $H_2$: rest | 13.3 | 950 |
| AlON *2 | $AlCl_3$: 1.5%, $NH_3$: 6.0%, $N_2$: 40%, $CO_2$: 1.0%, $H_2$: rest | 6.8 | 1100 |
| TiN | $TiCl_4$: 2.0%, $N_2$: 25%, $H_2$: rest | 13.3 | 950 |
| TiC | $TiCl_4$: 2.0%, $CN_4$: 5%, $H_2$: rest | 13.3 | 1050 |
| TiCN | $TiCl_4$: 2.0%, $CH_3CN$: 0.6%, $N_2$: 20%, $H_2$: rest | 6.7-80 | 800-950 |
| ZrCN | $ZrCl_4$: 1.0%, $CH_3CN$: 0.6%, $N_2$: 35%, $H_2$: rest | 6.7 | 890 |
| TiZrCN | $TiCl_4$: 1.5%, $ZrCl_4$: 1.0%, $CH_3CN$: 1.0%, $N_2$: 45%, $H_2$: rest | 6.7 | 975 |
| TiCNO | $TiCl_4$: 2.0%, $CO_2$: 2.5%, $N_2$: 8%, $H_2$: rest | 6.7 | 975 |
| TiBN | $TiCl_4$: 2.0%, $BCl_3$: 5.0%, $N_2$: 5.0%, $H_2$: rest | 13.3 | 950 |
| HfCN | $HfCl_4$: 1.0%, $CH_3CN$: 1.2%, $N_2$: 40%, $H_2$: rest | 6.7 | 1025 |
| α $Al_2O_3$ | $AlCl_3$: 2.0%, $H_2S$: 0.3%, $CO_2$: 5.0%, $H_2$: rest | 6.7 | 1050 |
| κ $Al_2O_3$ | $AlCl_3$: 2.0%, $CO_2$: 5.0%, CO: 0.5%, $H_2$: rest | 6.7 | 1000 |
| $ZrO_2$ | $ZrCl_4$: 2.0%, $CO_2$: 7.0%, $H_2$: rest | 6.7 | 1050 |
| $Al_2O_3$—$ZrO_2$ | $AlCl_3$: 1.5%, $ZrCl_4$: 0.3%, $CO_2$: 9.0%, $H_2$: rest | 13.3 | 1070 |

*1 Chlorine content is more than 0 and no more than 0.5 atomic percent
*2 No chlorine
*3 Chlorine content is more than 0.5 atomic percent

TABLE 13

| Test sample No. | Outermost layer | Chlorine content (atomic %) |
|---|---|---|
| 6-1 | AlN *1 | 0.03 |
| 6-2 | AlN *1 | 0.18 |
| 6-3 | AlN *1 | 0.48 |
| 6-4 | AlN *2 | 0 |
| 6-5 | AlN *3 | 0.98 |

Using the cutting conditions shown in Table 14, the cutting efficiency of surface-coated end mills with outermost layers as shown in Table 13 was observed. For the cutting conditions 1, the wear for a fixed cutting length (150 m) was measured. In this test, the flank face wear (microns) on the peripheral cutting edge was measured. For the cutting conditions 2, a fixed boring operation (10 mm diameter) was performed. The torque applied during boring was measured and the state after changing to a fixed slot milling operation (50 mm) after the boring operation was observed. The results of the tests are shown in Table 15.

TABLE 14

| Cutting conditions 1 | Cutting conditions 2 |
|---|---|
| Side milling | 10 mm boring, then 50 mm fluting |
| Workpiece: S50C | Workpiece: SKD11 |
| Speed: V = 300 m/min | Speed: V = 80 m/min |
| Feed per cutting edge: ft = 0.1 mm | Feed: Boring 0.07 mm/rev., |
| Axial cutting depth: Ad = 8 mm | Fluting 0.15 mm/t |
| Radial cutting depth: Rd = 0.5 mm | (per cutting edge) |
| Cutting oil: None | Cutting oil: None |
| Cutting distance: 150 m | |

TABLE 15

| Test sample No. | Cutting conditions 1 Flank face wear (peripheral cutting edge, microns) | Cutting conditions 2 Maximum torque (N · cm) |
|---|---|---|
| 6-1 | 55 | 610 |
| 6-2 | 31 | 410 |
| 6-3 | 42 | 550 |
| 6-4 | 92 | 1050 (breakage during fluting) |
| 6-5 | 115 (chipping) | 1120 (breakage during fluting) |

Based on the results, in Test Samples 6-1 through 6-3, which have aluminum nitride layers with more than 0 and not more than 0.5 atomic percent of chlorine on the outermost layer as shown in Table 15 and an inner layer with films having a predetermined composition, wear was reduced and superior lubricity and improved fracturing resistance due to reduced cutting force was observed even in dry cutting. Because Test Samples 6-1-6-3 were formed with a coating layer having superior lubricity, chip ejection qualities were good. As a result, torque increases were limited and breaking resistance was improved, allowing problem-free cutting. With Test Samples 6-4, 6-5, torque increased and breakage occurred when switching to slot milling. Furthermore, these Test Samples 6-1-6-3 provided superior welding resistance and peeling of the coating layer and the like did not take place. Based on these factors, it could be seen that Test Samples 6-1-6-3 were able to extend tool life.

TEST EXAMPLE 2-2

Substrates similar to those from the cemented carbide end mill substrates used in the Test Example 2-1 were prepared. Thermal CVD was performed on the area associated with cutting, and coating layers were formed under the film forming conditions (gas composition, pressure, temperature) shown in Table 12. Table 16 shows the composition, film thicknesses, and the film thickness of the entire coating layer (total film thickness). In Table 16, the films are indicated sequentially as the first film, the second film, and the like starting from the film closest to the substrate.

TABLE 16

| Test Sample No. | First film Type | Thickness | Second film Type | Thickness | Third film Type | Thickness | Fourth film Type | Thickness | Fifth film Type | Thickness | Sixth film Type | Thickness | Total thickness μm | Flank face wear μm |
|---|---|---|---|---|---|---|---|---|---|---|---|---|---|---|
| 7-1 | TiCN | 3.0 | AlN*1 | 1.0 | | | | | | | | | 4.0 | 62 |
| 7-2 | TiN | 0.5 | ZrCN | 7.0 | AlN*1 | 0.5 | | | | | | | 8.0 | 35 |
| 7-3 | TiN | 1.0 | TiCN | 4.5 | TiC | 1.5 | TiCNO | 1.0 | κAl$_2$O$_3$ | 3.0 | AlCN*1 | 5.0 | 16.0 | 33 |
| 7-4 | TiN | 0.3 | TiCN | 6.5 | TiBN | 0.5 | κAl$_2$O$_3$ | 1.5 | TiN | 0.3 | AlN*1 | 3.0 | 12.1 | 53 |
| 7-5 | TiN | 0.5 | TiCN | 14.0 | Al$_2$O$_3$—ZrO$_2$ | 5.0 | AlN*1 | 2.0 | | | | | 21.5 | 31 |
| 7-6 | TiCN | 3.0 | TiZrCN | 5.0 | ZrO$_2$ | 2.3 | Al$_2$O$_3$—ZrO$_2$ | 2.5 | AlON*1 | 1.7 | | | 14.5 | 44 |
| 7-7 | TiCN | 3.2 | TiN | 0.5 | HfCN | 4.3 | AlCN*1 | 2.5 | | | | | 10.5 | 60 |
| 7-8 | TiN | 0.5 | TiBN | 1.3 | αAl$_2$O$_3$ | 5.0 | AlN*1 | 0.05 | | | | | 6.85 | 52 |
| 7-9 | HfCN | 3.5 | αAl$_2$O$_3$ | 1.5 | TiCNO | 2.3 | TiCN | 6.5 | TiN | 0.7 | AlCN*1 | 0.7 | 15.2 | 41 |
| 7-10 | TiN | 2.0 | TiZrCN | 14.0 | AlCN*1 | 7.0 | | | | | | | 2.3 | 35 |
| 7-11 | TiN | 0.5 | TiCN | 4.5 | AlCN*1 | 0.5 | AlN*1 | 0.5 | | | | | 6.0 | 56 |
| 7-12 | TiN | 0.5 | TiCNO | 2.0 | TiCN | 6.0 | TiBN | 0.5 | κAl$_2$O$_3$ | 1.5 | AlCN*1 | 0.7 | 11.2 | 54 |
| 7-13 | HfCN | 4.0 | TiN | 1.0 | | | | | | | | | 5.0 | 135 |
| 7-14 | TiN | 0.5 | TiCN | 5.0 | TiCNO | 0.5 | ZrO$_2$ | 2.0 | TiCN | 0.1 | TiN | 2.0 | 10.1 | 180 |
| 7-15 | TiN | 0.5 | AlON*1 | 2.0 | αAl$_2$O$_3$ | 3.0 | TiN | 1.5 | | | | | 7.0 | 128 |
| 7-16 | ZrCN | 0.07 | AlN*1 | 0.02 | | | | | | | | | 0.09 | 82 |
| 7-17 | TiN | 0.5 | ZrCN | 4.0 | AlN*1 | 0.02 | | | | | | | 4.52 | 95 |
| 7-18 | TiN | 0.5 | TiCN | 3.0 | TiCNO | 9.0 | αAl$_2$O$_3$ | 3.5 | Al$_2$O$_3$—ZrO$_2$ | 5.0 | AlCN*1 | 8.0 | 29.0 | 98 |
| 7-19 | TiCN | 4.0 | TiBN | 2.0 | ZrO$_2$ | 2.0 | AlCN*1 | 7.0 | | | | | 15.0 | 92 |
| 7-20 | TiN | 1.0 | ZrCN | 4.0 | AlON*2 | 1.3 | | | | | | | 6.3 | 210 |
| 7-21 | AlN*1 | 5.0 | | | | | | | | | | | 5.0 | 165 |
| 7-22 | TiN | 3.0 | AlCN*1 | 1.0 | | | | | | | | | 4.0 | 88 |
| 7-23 | TiZrCN | 10.0 | AlCN*1 | 4.0 | | | | | | | | | 14.0 | 93 |

The surface-coated end mills with the coatings shown in Table 16 were used to perform side milling under the conditions described below, and wear for a fixed cutting length (100 m) was measured. In this test, the flank face wear (microns) on the peripheral cutting edge was measured. Table 16 shows the results from the test as well.

End mill side milling
Workpiece: SUS304
Speed: V=130 m/min
Feed per cutting edge: ft=0.03 mm
Axial cutting depth: Ad=8 mm
Radial cutting depth: Rd=0.16 mm
Cutting oil: none
Cutting length: 100 m As a result, it was found as shown in Table 16 that, compared to the other test samples, Test Samples 7-1-7-12, 7-16-7-19, 7-22, 7-23, which had an aluminum nitride film containing a predetermined amount of chlorine as the outermost layer and an inner layer with films having a predetermined composition, provided superior lubricity and superior wear resistance.

Also, the results shown in Table 16 indicate that it is preferable for the outermost layer to be at least 0.03 microns and for the total film thickness to be at least 0.1 microns and no more than 24 microns. Furthermore, it can be seen that it is preferable for the outermost layer to have no more than ½ the total thickness of the inner layer.

The end mills from test sample 7-1-7-23 were all cut and the surface roughness relative to a 5 micron reference length was measured for the area of the outermost layer near the ridge line of the cutting edge of the peripheral cutting edge that comes into contact with the workpiece. As a result, it was found that Rmax was no more than 1.3 microns for all end mills except Test Sample 7-22, while the Rmax of Test Sample 7-22 was 1.7 microns. For Test Sample 7-22, a #1500 diamond paste was used to polish the area of the outermost layer of the peripheral cutting edge near the ridge line of the cutting edge that comes into contact with the workpiece. When the method described above was used to measure surface roughness after polishing, Rmax was 0.52 microns. When side milling was performed under the same cutting conditions using the polished end mill, the flank face wear was 65 microns. This is believed to be caused by a reduction in the cutting force resulting from less roughness at the area of the outermost layer near the ridge line of the cutting edge that comes into contact with the workpiece. When the surface roughness of Test Sample 7-1 was measured as described above, the Rmax was 0.9 microns, but when the cutting edge was polished in the same manner, the flank face wear after another cutting operation was found to be significantly improved, at 35 microns.

Furthermore, a coating film was formed on Test Sample 7-23 to make the film hardness of the inner layer lower than that of the outermost layer. Then, the hardnesses of the films forming the coating layers of Test Samples 7-1-7-20, 7-22, and 7-23 were measured. The film hardness of the outermost layer was lower than that of at least one film of the inner layer for all the end mills, with the exception of Test Sample 7-23. With Test Sample 7-23, the film hardness of the outermost layer was higher than that of the inner layer. As a result, it is believed that the cutting efficiency of Test Sample 7-23 was reduced.

TEST EXAMPLE 2-2'

Surface-coated end mills similar to those of Test Samples 7-1-7-23 were prepared and cutting tests were performed under the cutting conditions described below. Crater wear (width) was then measured for a predetermined cutting length (50 m). Measurements were made of crater wear widths on the peripheral cutting edge. Because end mills have a threedimensional shape, this width was measured obliquely. More specifically, crater wear width was measured by observing from a fixed angle.

Results were evaluated based on these measurements by comparing the different test samples.
  Workpiece: S50C
  Speed: V=100 m/min
  Feed: f=0.05 mm/t
  Cutting depth: Ad=10 mm Rd=0.6 mm
  Cutting oil: none (air blower)

The results indicated that crater wear was lower for Test Samples 7-1-7-12, 7-16-7-19, 7-22, 7-23 compared to the other test samples. For example, if the wear width of Test Sample 7-14 is defined as 1, Test Samples 7-3, 7-6 had the values 0.44 and 0.52 respectively.

TEST EXAMPLE 2-3

Surface-coated end mills were prepared using the substrate described below with a widely known PVD method being used to form a coating layer having a composition similar to that of Test Samples 7-2, 7-13 from Table 16. For the end mill with a coating layer having a composition similar to that of the Test Sample 7-2, the surface-coated end mill was formed by adding chlorine to the outermost layer using ion implantation after the coating layer was formed. Then, side milling was performed using the same cutting conditions as Test Example 2-2. The coating layers were all formed at areas associated with cutting.

The test samples with the coating layer from Test Sample 7-2 all had a chlorine content of 0.2 atomic percent on the outermost layer.
1 Brazed end mill substrate formed from cemented carbide corresponding to JIS Z20 (cutting section is cemented carbide)
2 Two-edge square end mill substrate formed from JIS-standard P20 cermet (10 mm diameter)
3 Brazed ball mill substrate formed from cubic boron nitride (Sumitomo Electric Hardmetal Corp. Ltd., BN300) (cutting section is cubic boron nitride)

The results indicated that all the surface-coated end mills formed with the coating layer from Test Sample 7-2 provided superior lubricity and wear resistance. It was found that the tool life was at least twice that of end mills formed with the conventional coating layer from Test Sample 7-13.

TEST EXAMPLE 2-4

Two-edge square end mill substrates (solid end mills) formed from cemented carbide corresponding to JIS Z20 (10 mm diameter) were prepared. Thermal CVD, which is a chemical vapor deposition technique, was performed to form a coating layer on the substrate at the surface of the areas (body) associated with cutting. In this test, the following layers were formed, starting from the substrate side: TiN(0.5), columnar structure TiCN(4), TiBN(0.5), κ-$Al_2O_3$(1), and an outermost layer formed from AlN (1.5). The numbers in parentheses indicate film thickness in microns. Table 17 shows an example of film forming conditions for each film. Specifically, the composition of the reaction gas (percent by volume), the pressure applied when forming the film (kPa), and the film forming temperature (deg C.) are shown. Film thickness was controlled by controlling the film forming time. In this test, the TiCN film has a columnar structure with an aspect ratio of 4.1 and the index of orientation TC is highest at the (311) face. More specifically, the TiN film formation conditions (gas composition, pressure, temperature) were set up so that the reaction gas was $CH_3CN$, the temperature was 900 deg C., the pressure was 8 kPa, and the surface roughness Rmax (5 microns reference length) of the TiN film formed below the TiCN film was 0.1 microns. Test samples in which the AlN film at the outermost layer have different chlorine contents were prepared by varying the film forming conditions as shown in Table 17. Table 18 shows chlorine content at the outermost layer. Specifically, samples with more than 0 and no more than 0.5 atomic percent of chlorine, samples with more than 0.5 atomic percent of chlorine, and samples with no chlorine were prepared. Chlorine content was varied as shown in Table 17 by varying the proportion of hydrogen chloride (HCl) in the reaction gas. Also, depending on the amount of hydrogen chloride, the film forming pressure and the film forming temperature were varied as appropriate. Furthermore, the surface roughness at sites on the outermost layer near the ridge line of the cutting edge at areas that come into contact with the workpiece were studied for test samples containing more than 0 and no more than 0.5 atomic percent of chlorine in the outermost layer. Observation of the tool cross-sections showed that the Rmax for a reference length of 5 microns was no more than 1.3 microns for all samples. More specifically, the Rmax was 0.6 microns for Test Sample 8-2, for example. The chlorine content was measured using XPS (X-ray Photoelectron Spectroscopy), but composition can also be studied using micro-EDX (Energy Dispersive X-ray Spectroscopy) combined with a transmission electron microscope or using SIMS (Secondary Ion Mass Spectrometry).

TABLE 17

| Coating layer | Reaction gas composition (vol %) | Pressure (kPa) | Temperature (deg C.) |
|---|---|---|---|
| AlN *[1] | $AlCl_3$: 1.0-5.0%, $NH_3$: 0.1-5.0%, $N_2$: 20-50%, HCl: 0.01-1.0%, $H_2$: rest | 4.0-80 | 750-980 |
| AlCN *[1] | $AlCl_3$: 1.0-5.0%, $NH_3$: 0.1-5.0%, $N_2$: 20-50%, $CH_4$: 0.5-5.0%, HCl: 0.01-1.0%, $H_2$: rest | 4.0-80 | 750-980 |
| AlON *[1] | $AlCl_3$: 1.0-5.0%, $NH_3$: 0.1-5.0%, $N_2$: 20-50%, $CO_2$: 0.2-3.0%, HCl: 0.01-1.0%, $H_2$: rest | 4.0-80 | 750-980 |
| AlN *[2] | $AlCl_3$: 1.5%, $NH_3$: 1.0%, $N_2$: 40%, $H_2$: rest | 5.0 | 1000 |
| AlN *[3] | $AlCl_3$: 1.5%, $NH_3$: 3.0%, $N_2$: 40%, HCl: 5.0%, $H_2$: rest | 13.3 | 950 |
| AlON *[2] | $AlCl_3$: 1.5%, $NH_3$: 6.0%, $N_2$: 40%, $CO_2$: 1.0%, $H_2$: rest | 6.8 | 1100 |
| TiN | $TiCl_4$: 2.0%, $N_2$: 25%, $H_2$: rest | 13.3 | 950 |
| TiC | $TiCl_4$: 2.0%, $CN_4$: 5%, $H_2$: rest | 13.3 | 1050 |
| Granular TiCN | $TiCl_4$: 4.0%, $CH_4$: 4.0%, $N_2$: 20%, $H_2$: rest | 14 | 1020 |
| Columnar TiCN | $TiCl_4$: 3.0%, $CH_3CN$: 0.6%, $N_2$: 20%, $H_2$: rest | 4.0-80 | 800-950 |
| ZrCN | $ZrCl_4$: 1.0%, $CH_3CN$: 0.6%, $N_2$: 35%, $H_2$: rest | 6.7 | 890 |
| TiZrCN | $TiCl_4$: 1.5%, $ZrCl_4$: 1.0%, $CH_3CN$: 1.0%, $N_2$: 45%, $H_2$: rest | 6.7 | 975 |
| TiCNO | $TiCl_4$: 2.0%, $CO_2$: 2.5%, $N_2$: 8%, $H_2$: rest | 6.7 | 975 |
| TiBN | $TiCl_4$: 2.0%, $BCl_3$: 5.0%, $N_2$: 5.0%, $H_2$: rest | 13.3 | 950 |
| HfCN | $HfCl_4$: 1.0%, $CH_3CN$: 1.2%, $N_2$: 40%, $H_2$: rest | 6.7 | 1025 |
| α $Al_2O_3$ | $AlCl_3$: 2.0%, $H_2S$: 0.3%, $CO_2$: 5.0%, $H_2$: rest | 6.7 | 1050 |
| κ $Al_2O_3$ | $AlCl_3$: 2.0%, $CO_2$: 5.0%, CO: 0.5%, $H_2$: rest | 6.7 | 1000 |
| $ZrO_2$ | $ZrCl_4$: 2.0%, $CO_2$: 7.0%, $H_2$: rest | 6.7 | 1050 |

TABLE 17-continued

| Coating layer | Reaction gas composition (vol %) | Pressure (kPa) | Temperature (deg C.) |
|---|---|---|---|
| $Al_2O_3$—$ZrO_2$ | $AlCl_3$: 1.5%, $ZrCl_4$: 0.3%, $CO_2$: 9.0%, $H_2$: rest | 13.3 | 1070 |

*[1] Chlorine content is more than 0 and no more than 0.5 atomic percent
*[2] No chlorine
*[3] Chlorine content is more than 0.5 atomic percent

TABLE 18

| Test sample No. | Outermost layer | Chlorine content (atomic %) |
|---|---|---|
| 8-1 | AlN *[1] | 0.03 |
| 8-2 | AlN *[1] | 0.18 |
| 8-3 | AlN *[1] | 0.48 |
| 8-4 | AlN *[2] | 0 |
| 8-5 | AlN *[3] | 0.98 |

Using the cutting conditions shown in Table 19, the cutting efficiency of surface-coated end mills with outermost layers as shown in Table 18 was observed. For the cutting conditions I, the wear for a fixed cutting length (150 m) was measured. In this test, the flank face wear (microns) on the peripheral cutting edge was measured. For the cutting conditions II, a fixed boring operation (10 mm diameter) was performed. The torque applied during boring was measured and the state after changing to a fixed slot milling operation (50 mm) after the boring operation was observed. The results of the tests are shown in Table 20.

TABLE 19

| Cutting conditions I | Cutting conditions II |
|---|---|
| Side milling | 10 mm boring, 50 mm fluting |
| Workpiece: S50C | Workpiece: SKD11 |
| Speed: V = 300 m/min | Speed: V = 80 m/min |
| Feed per cutting edge: ft = 0.1 mm | Feed: Boring 0.07 mm/rev., Fluting 0.15 mm/t (per cutting edge) |
| Axial cutting depth: Ad = 8 mm | |
| Radial cutting depth: Rd = 0.5 mm | |
| Cutting oil: none | Cutting oil: none |
| Cutting distance: 150 m | |

TABLE 20

| Test Sample No. | Cutting conditions I Flank face wear (peripheral cutting edge, microns) | Cutting conditions II Maximum torque (N · cm) |
|---|---|---|
| 8-1 | 42 | 680 |
| 8-2 | 21 | 430 |
| 8-3 | 35 | 510 |
| 8-4 | 85 | 1110 (Breakage during fluting) |
| 8-5 | 121 (Chipping) | 1050 (Breakage during fluting) |

Based on the results, the Test Samples 8-1 through 8-3, which have aluminum nitride layers with more than 0 and not more than 0.5 atomic percent of chlorine on the outermost layer as shown in Table 20 and predetermined inner TiCN film layers, wear was reduced and superior lubricity and improved wear resistance and fracturing resistance due to reduced cutting force was observed even in dry cutting. Because Test Samples 8-1-8-3 were formed with a coating layer having superior lubricity, chip ejection qualities were good. As a result, torque increases were limited and breaking resistance was improved, allowing problem-free cutting. With Test Samples 8-4, 8-5, torque increased and breakage occurred when switching to slot milling. Furthermore, these Test Samples 8-1-8-3 provided superior welding resistance and peeling of the coating layer and the like did not take place. Based on these factors, it was shown that Test Samples 8-1-8-3 were able to extend tool life.

TEST EXAMPLE 2-5

Substrates similar to those from the cemented carbide end mill substrates used in Test Example 2-4 were prepared. Thermal CVD was performed on the surfaces of locations associated with cutting, and coating layers were formed under the film forming conditions (gas composition, pressure, temperature) shown in Table 17. In this test, the following layers were formed, starting from the substrate side: TiN(0.5), columnar structure TiCN(4) or granular structure TiCN(4), TiBN(0.5), $Al_2O_3$—$ZrO_2$(1), and an outermost layer formed from AlN*[1] (1.5) (Test Sample 8-3 from Table 18). The numbers in parentheses indicate film thickness in microns. Film thickness was controlled by controlling the film forming time. In this test, the aspect ratio and the face with the maximum index of orientation of the columnar structure TiCN film are varied, as shown in Table 17, by varying the film forming pressure and temperature as well as by varying the surface roughness and gas conditions for the TiN film formed below the TiCN film. More specifically, the aspect ratio of the TiCN film was set to at least 3 by using $CH_3CN$ as the reaction gas, with the gas temperature set to 920 deg C. and the pressure set to 6 kPa and the $CH_3CN$ reaction gas being introduced gradually. Also, if the TiCN film maximum index of orientation is to be TC(422), for example, the surface roughness Rmax (5 microns reference length) of the substrate is set to 0.09 microns and the TiCN film is formed while adjusting the aspect ratio outward from the substrate (away from the substrate). Furthermore, for all the test samples, the surface of the outermost layer was polished after forming the outermost layer so that the section of the outermost layer around the ridge line of the cutting edge that comes into contact with the workpiece had a surface roughness Rmax of 0.4 microns for 5 microns reference length when measured by observing tool cross-sections. Table 21 shows TiCN film structure, aspect ratio, and the face with the maximum index of orientation TC.

TABLE 21

| Test Sample No. | Inner layer TiCN film | | | Flank wear (outer perimeter, microns) |
|---|---|---|---|---|
| | Structure | Aspect ratio | Face with maximum TC | |
| 9-1 | Columnar | 5.3 | 311 | 72 |
| 9-2 | Columnar | 6.8 | 422 | 64 |
| 9-3 | Columnar | 3.3 | 220 | 85 |
| 9-4 | Columnar | 2.4 | 220 | 140 |
| 9-5 | Columnar | 3.8 | 420 | 182 |
| 9-6 | Granular | — | 311 | 255(Chipping) |

The surface-coated end mills with TiCN film at the inner layer shown in Table 21 were used to perform side milling under the conditions described below, and flank face wear (microns) on the outer perimeter for a fixed cutting length (80 m) was measured. Table 21 shows the results from the test as well.

End mill side milling
Workpiece: SKD11
Speed: V=250 m/min
Feed per cutting edge: ft=0.05 mm
Axial cutting depth: Ad=8 mm
Radial cutting depth: Rd=0.15 mm
Cutting oil: none
Cutting length: 80 m The results show that with a TiCN film at the inner layer as in Table 21, a columnar structure provides superior wear resistance. More specifically, with the Test Samples 9-1-9-3, which are formed with columnar structure TiCN film at the inner layer with an aspect ratio of at least 3 and a maximum index of orientation of TC(311), TC(220), or TC(422), wear resistance is especially superior, even when dry cutting. The reduced wear is believed to be because of the superior lubricity of the outermost layer and the use of a predetermined TiCN film with superior wear resistance as the inner layer.

TEST EXAMPLE 2-6

Substrates similar to those from the cemented carbide end mill substrates used in Test Example 2-4 were prepared. Thermal CVD was performed on locations associated with cutting, and coating layers were formed under the film forming conditions (gas composition, pressure, temperature) shown in Table 17. In this test, the film forming conditions were controlled so that columnar structure TiCN films had an aspect ratio of at least 3 and the maximum index of orientation was TC(311), TC(220), or TC(422). Table 22 shows the composition, film thicknesses, and the film thickness of the entire coating layer (total film thickness). In Table 22, the films are indicated sequentially as the first film, the second film, and the like starting from the film closest to the substrate.

TABLE 22

| Test Sample No. | First film Type | Thickness | Second film Type | Thickness | Third film Type | Thickness | Fourth film Type | Thickness | Fifth film Type | Thickness | Sixth layer Type | Thickness | Total thickness μm | Flank face wear μm |
|---|---|---|---|---|---|---|---|---|---|---|---|---|---|---|
| 10-1 | columnar TiCN | 3.0 | AlN*1 | 1.0 | | | | | | | | | 4.0 | 52 |
| 10-2 | columnar TiCN | 0.5 | ZrCN | 7.0 | AlN*1 | 0.5 | | | | | | | 8.0 | 31 |
| 10-3 | TiN | 1.0 | columnar TiCN | 4.5 | TiC | 1.5 | TiCNO | 1.0 | κ Al$_2$O$_3$ | 3.0 | AlCN*1 | 5.0 | 16.0 | 34 |
| 10-4 | TiN | 0.3 | columnar TiCN | 6.5 | TiBN | 0.5 | κ Al$_2$O$_3$ | 1.5 | TiN | 0.3 | AlN*1 | 3.0 | 12.1 | 48 |
| 10-5 | TiN | 0.5 | columnar TiCN | 14.0 | Al$_2$O$_3$—ZrO$_2$ | 5.0 | AlN*1 | 2.0 | | | | | 21.5 | 26 |
| 10-6 | columnar TiCN | 3.0 | TiZrCN | 5.0 | ZrO$_2$ | 2.3 | Al$_2$O$_3$—ZrO$_2$ | 2.5 | AlON*1 | 1.7 | | | 14.5 | 44 |
| 10-7 | columnar TiCN | 3.2 | TiN | 0.5 | HfCN | 4.3 | AlCN*1 | 2.5 | | | | | 10.5 | 51 |
| 10-8 | columnar TiCN | 0.5 | TiBN | 1.3 | α Al$_2$O$_3$ | 5.0 | AlN*1 | 0.05 | | | | | 6.85 | 54 |
| 10-9 | HfCN | 3.5 | α Al$_2$O$_3$ | 1.5 | TiCNO | 2.3 | columnar TiCN | 6.5 | TiN | 0.7 | AlCN*1 | 0.7 | 15.2 | 38 |
| 10-10 | columnar TiCN | 5.0 | TiZrCN | 10.0 | AlCN*1 | 7.0 | | | | | | | 22 | 40 |
| 10-11 | TiN | 0.5 | columnar TiCN | 4.5 | AlCN*1 | 0.5 | AlN*1 | 0.5 | | | | | 6.0 | 48 |
| 10-12 | TiN | 0.5 | TiCNO | 2.0 | columnar TiCN | 6.0 | TiBN | 0.5 | κ Al$_2$O$_3$ | 1.5 | AlCN*1 | 0.7 | 11.2 | 53 |
| 10-13 | columnar TiCN | 2.0 | HfCN | 2.0 | TiN | 1.0 | | | | | | | 5.0 | 145 |
| 10-14 | TiN | 0.5 | columnar TiCN | 5.0 | TiCNO | 0.5 | ZrO$_2$ | 2.0 | columnar TiCN | 0.1 | TiN | 2.0 | 10.1 | 160 |
| 10-15 | columnar TiCN | 0.5 | AlON*1 | 2.0 | α Al$_2$O$_3$ | 3.0 | TiN | 1.5 | | | | | 7.0 | 136 |
| 10-16 | columnar TiCN | 0.07 | AlN*1 | 0.02 | | | | | | | | | 0.09 | 105 |

TABLE 22-continued

| Test Sample No. | First film Type | Thickness | Second film Type | Thickness | Third film Type | Thickness | Fourth film Type | Thickness | Fifth film Type | Thickness | Sixth layer Type | Thickness | Total thickness μm | Flank face wear μm |
|---|---|---|---|---|---|---|---|---|---|---|---|---|---|---|
| 10-17 | columnar TiCN | 0.5 | ZrCN | 4.0 | AlN*[1] | 0.02 | | | | | | | 4.52 | 98 |
| 10-18 | TiN | 0.5 | columnar TiCN | 3.0 | TiCNO | 9.0 | α Al₂O₃ | 3.5 | Al₂O₃—ZrO₂ | 5.0 | AlCN*[1] | 8.0 | 29.0 | 102 |
| 10-19 | columnar TiCN | 4.0 | TiBN | 2.0 | ZrO₂ | 2.0 | AlCN*[1] | 7.0 | | | | | 15.0 | 95 |
| 10-20 | TiN | 0.2 | columnar TiCN | 0.8 | ZrCN | 4.0 | AlON*[2] | 1.3 | | | | | 6.3 | 148 |
| 10-21 | columnar TiCN | 10.0 | AlCN*[1] | 4.0 | | | | | | | | | 14.0 | 94 |

The surface-coated end mills with the coatings shown in Table 22 were used to perform side milling under the conditions described below, and wear for a fixed cutting length (100 m) was measured. In this test, the flank face wear (microns) on the peripheral cutting edge was measured. Table 22 shows the results from the test as well.

End mill side milling
Workpiece: SUS304
Speed: V=144 m/min
Feed per cutting edge: ft=0.03 mm
Axial cutting depth: Ad=8 mm
Radial cutting depth: Rd=0.16 mm
Cutting oil: none
Cutting length: 100 m As a result, it was found as shown in Table 22, that, compared to the other test samples, Test Samples 10-1-10-12, 10-16-10-19, 10-21, which had an aluminum nitride film containing a predetermined amount of chlorine as the outermost layer and a columnar structure TiCN film inner layer with an aspect ratio of at least 3 and a maximum index of orientation of TC(311), TC(220), or TC(422), provided superior lubricity and superior wear resistance.

Also, the results shown in Table 22 indicate that it is preferable for the outermost layer to be at least 0.03 microns and for the total film thickness to be at least 0.1 microns and no more than 24 microns. Furthermore, it can be seen that it is preferable for the outermost layer to have no more than ½ the total thickness of the inner layer.

The end mills from the test sample 10-1-10-21 were all cut and the surface roughness relative to a 5 micron reference length was measured for the area of the outermost layer near the ridge line of the cutting edge of the peripheral cutting edge that contacts the workpiece. As a result, it was found that Rmax was no more than 1.3 microns for all end mills except Test Sample 10-21, while the Rmax of Test Sample 10-21 was 1.6 microns. For Test Sample 10-21, a #1500 diamond paste was used to polish the area of the outermost layer of the peripheral cutting edge near the ridge line of the cutting edge that comes into contact with the workpiece. When the method described above was used to measure surface roughness after polishing, Rmax was 0.61 microns. When side milling was performed under the same cutting conditions using the polished end mill, the flank face wear was 48 microns. This is believed to be caused by a reduction in the cutting force resulting from less roughness at the area of the outermost layer near the ridge line of the cutting edge that comes into contact with the workpiece.

TEST EXAMPLE 2-6'

Surface-coated end mills similar to those of Test Samples 10-1-10-21 were prepared and cutting tests were performed under the cutting conditions described below. Crater wear (width) on the peripheral cutting edge was then measured for a predetermined cutting length (50 m).

The measurement of crater wear width was performed in a manner similar to that of the cutting test (Test Example 2-2') that used the surface-coated end mills from Test Samples 7-1-7-23.

Workpiece: S50C
Speed: V=120 m/min
Feed: f=0.05 mm/t
Cutting depth: Ad=10 mm Rd=0.6 mm
Cutting oil: none (air blower)

The results showed that Test Samples 10-1-10-12, 10-16-10-19, and 10-21 had less crater wear compared to the other samples. For example, if the wear width of Test Sample 7-14 from Test Example 2-2' is defined as 1, Test Samples 10-3, 10-6 had the values 0.39 and 0.42 respectively.

TEST EXAMPLE 2-7

Surface-coated end mills were prepared using the substrate described below with a widely known PVD method being used to form a coating layer having a composition similar to that of Test Samples 10-2, 10-13 from Table 22. For the end mill with a coating layer having a composition similar to that of the Test Sample 10-2, the surface-coated end mill was formed by adding chlorine to the outermost layer using ion implantation after the coating layer was formed. Then, side milling was performed using the same cutting conditions as Test Example 2-6. The coating layers were all formed at areas associated with cutting.

The test samples with the coating layer from Test Sample 10-2 all had a chlorine content of 0.2 atomic percent on the outermost layer.

1 Brazed end mill substrate formed from cemented carbide corresponding to JIS Z20 (cutting section is cemented carbide)

2 Two-edge square end mill substrate formed from JIS-standard P20 cermet (10 mm diameter)

3 Brazed ball mill substrate formed from cubic boron nitride (Sumitomo Electric Hardmetal Corp. Ltd., BN300) (cutting section is cubic boron nitride)

The results indicated that all the surface-coated end mills formed with the coating layer from the Test Sample 10-2 provided superior lubricity and wear resistance. It was found that the tool life was at least twice that of end mills formed with the conventional coating layer from the Test Sample 10-13.

THIRD EXAMPLE

The present invention will be described in further detail using drills as an example.

TEST EXAMPLE 3-1

Solid drill substrates formed from cemented carbide corresponding to JIS K10 (8 mm diameter) were prepared. Thermal CVD, which is a chemical vapor deposition technique, was performed to form a coating layer on the substrate at the surface of the areas (body) associated with cutting based on the film forming conditions from Table 12. In this test, the following layers were formed, starting from the substrate side: an inner layer formed from TiN(0.5), TiCN(4), TiBN (0.5), κ-$Al_2O_3$(1) and an outermost layer formed from AlN (1.5). The numbers in parentheses indicate film thickness in microns. Film thickness was controlled by controlling the film forming time. Test samples in which the AlN film at the outermost layer have different chlorine contents were prepared by varying the film forming conditions as shown in Table 12. Table 23 shows chlorine content at the outermost layer. Specifically, samples with more than 0 and no more than 0.5 atomic percent of chlorine, samples with more than 0.5 atomic percent of chlorine, and samples with no chlorine were prepared. Chlorine content was varied as shown in Table 12 by varying the proportion of hydrogen chloride (HCl) in the reaction gas. Also, depending on the amount of hydrogen chloride, the film forming pressure and the film forming temperature were varied as appropriate. Furthermore, the surface roughness at sites on the outermost layer near the ridge line of the cutting edge at areas that come into contact with the workpiece were studied for test samples containing more than 0 and no more than 0.5 atomic percent of chlorine in the outermost layer. Observation of the tool cross-sections showed that the Rmax for a reference length of 5 microns was no more than 1.3 microns for all samples. More specifically, the Rmax was 0.6 microns for Test Sample 11-2, for example. The chlorine content was measured using XPS (X-ray Photoelectron Spectroscopy). Also, the Knoop hardness for each of the layers in the test samples was studied, and it was found that in all cases the outermost AlN film was softer than the inner TiCN film layer.

TABLE 23

| Test Sample No. | Outermost layer | Chlorine content (atomic percent) |
|---|---|---|
| 11-1 | AlN *1 | 0.03 |
| 11-2 | AlN *1 | 0.18 |
| 11-3 | AlN *1 | 0.48 |
| 11-4 | AlN *2 | 0 |
| 11-5 | AlN *3 | 0.98 |

Using the cutting conditions shown in Table 24, the cutting efficiency of the surface-coated drills with outermost layers as shown in Table 23 was observed. For cutting conditions 3, the number of holes bored until the tool broke was studied. For cutting conditions 4, the roundness of the holes was studied. The results of the tests are shown in Table 25.

TABLE 24

| Cutting conditions 3 | Cutting conditions 4 |
|---|---|
| Drill boring (through-hole) | Drill boring (blind hole) |
| Workpiece: SCM440 | Workpiece: NAK80 |
| Speed: V = 70 m/min | Speed: V = 70 m/min |
| Feed: f = 0.3 mm/rev. | Feed: f = 0.25 mm/rev. |
| Boring depth: 40 mm(L/D = 5) | Boring depth: 40 mm(L/D = 5) |
| Cutting oil: None (external air blower) | Cutting oil: water soluble |

TABLE 25

| Test sample No. | Cutting conditions 3 Number of holes before breakage | Cutting conditions 4 Roundness of hole entrance (microns) |
|---|---|---|
| 11-1 | At least 500 (no breaks) | 3.5 |
| 11-2 | At least 500 (no breaks) | 2.1 |
| 11-3 | At least 500 (no breaks) | 2.8 |
| 11-4 | 285 | 13.8 |
| 11-5 | 182 | 15.9 |

Based on the results, in the Test Samples 11-1 through 11-3, which have aluminum nitride layers with more than 0 and not more than 0.5 atomic percent of chlorine on the outermost layer as shown in Table 25, and inner layers with films having predetermined compositions, superior chip ejection properties were provided and damage to the cutting section was reduced, allowing good cuts over an extended period of time. This significantly increased the number of cuts that could be made until the tool broke. This indicates that tool life was extended. For the Test Samples 11-1-11-3, it was found that the roundness of the bored holes was superior and that high-precision cutting was possible. Furthermore, these Test Samples 11-1-11-3 provided superior welding resistance and peeling of the coating layer and the like did not take place.

TEST EXAMPLE 3-2

Substrates similar to those from the cemented carbide drill substrates used in the Test Example 3-1 were prepared. Thermal CVD was performed on the surface of the area associated with cutting, and coating layers were formed under the film forming conditions (gas composition, pressure, temperature) shown in Table 12 in the same manner as the coating layers indicated in Table 16.

The surface-coated drills with the coatings shown in Table 16 were used to perform boring operations under the conditions described below, and the number of holes bored until the tool life was reached was measured. The end of tool life was defined to be when flank face wear at the cutting section at the end reached 0.3 microns or when further cutting was not possible due to tool breakage or the like. The results of the tests are shown in Table 26.

Drill boring (blind hole)
Workpiece: S50C
Speed: V=100 m/min
Feed: f=0.2 mm/rev.
Hole depth: 24 mm (L/D=3)
Cutting oil: air blower

TABLE 26

| Test Sample No. | Film structure | Number of holes bored during tool life |
|---|---|---|
| 12-1 | 7-1 | 3500 |
| 12-2 | 7-2 | 4500 |
| 12-3 | 7-3 | 5500 |
| 12-4 | 7-4 | 4000 |
| 12-5 | 7-5 | 5000 |
| 12-6 | 7-6 | 4000 |
| 12-7 | 7-7 | 3500 |
| 12-8 | 7-8 | 4000 |
| 12-9 | 7-9 | 4500 |
| 12-10 | 7-10 | 5500 |
| 12-11 | 7-11 | 3500 |
| 12-12 | 7-12 | 3500 |
| 12-13 | 7-13 | 600 |
| 12-14 | 7-14 | 790 |
| 12-15 | 7-15 | 800 |
| 12-16 | 7-16 | 1260 |
| 12-17 | 7-17 | 1120 |
| 12-18 | 7-18 | 1310 |
| 12-19 | 7-19 | 1500 |
| 12-20 | 7-20 | 800 |
| 12-21 | 7-21 | 520 |
| 12-22 | 7-22 | 1190 |
| 12-23 | 7-23 | 1500 |

As a result, it was found as shown in Table 26 that, compared to the other test samples, the Test Samples 12-1-12-12, 12-16-12-19, 12-22, and 12-23, which had an aluminum nitride film containing a predetermined amount of chlorine as the outermost layer and films with predetermined compositions as the inner layers, provided superior lubricity and superior wear resistance.

Also, the results shown in Table 26 indicate that it is preferable for the outermost layer to be at least 0.03 microns and for the total film thickness to be at least 0.1 microns and no more than 24 microns. Furthermore, it can be seen that it is preferable for the outermost layer to have no more than ½ the total thickness of the inner layer.

The drills from the test sample 12-1-12-23 were all cut and the surface roughness relative to a 5 micron reference length was measured for the area of the outermost layer near the ridge line of the cutting edge of the peripheral cutting edge that comes into contact with the workpiece. As a result, it was found that Rmax was no more than 1.3 microns for all drills except Test Sample 12-22, while the Rmax of Test Sample 12-22 was 1.9 microns. For Test Sample 12-22, as in Test Sample 7-22, a #1500 diamond paste was used to polish the area of the outermost layer of the peripheral cutting edge near the ridge line of the cutting edge that comes into contact with the workpiece. When the method described above was used to measure surface roughness after polishing, Rmax was 0.45 microns. When boring was performed under the same cutting conditions using the polished drill, the number of operations performed was 4500. This is believed to be caused by a reduction in the cutting force resulting from less roughness at the area of the outermost layer near the ridge line of the cutting edge that comes into contact with the workpiece. When the surface roughness of the Test Sample 12-1 was measured as described above, the Rmax was 0.78 microns, but when the cutting edge was polished in the same manner, the cut count after another boring operation was found to be significantly improved, at 5000.

Furthermore, a coating film was formed on Test Sample 12-23 to make the film hardness of the inner layer lower than that of the outermost layer. Then, the hardnesses of the films forming the coating layers of Test Samples 12-1-12-20, 12-22, and 12-23 were measured. The film hardness of the outermost layer was lower than that of at least one film of the inner layer for all the drills, with the exception of Test Sample 12-23. With Test Sample 12-23, the film hardness of the outermost layer was higher than that of the inner layer. Based on this, it is believed that the cutting efficiency of Test Sample 12-23 was reduced compared to Test Samples 12-1-12-12.

TEST EXAMPLE 3-2'

Surface-coated drills similar to those of Test Samples 12-1-12-23 were prepared and cutting tests were performed under the cutting conditions described below. Crater wear (width) was then measured for a predetermined number of holes (500 holes). Measurements were made on the widths of crater wear near the center of the cutting section. Measurements were performed in a manner similar to those of Test Example 2-2'.

Results were evaluated based on these measurements by comparing the different test samples.
Workpiece: S50C (blind hole)
Speed: V=70 m/min
Feed: f=0.25 mm/rev.
Hole depth: 40 mm (L/D=5)
Cutting oil: mist (water soluble cutting fluid)

The results showed that Test Samples 12-1-12-12, 12-16-12-19, 12-22, and 12-23 had less crater wear compared to the other samples. For example, if the wear width of the Test Sample 12-14 is defined as 1, Test Samples 12-3, 12-9 had the values 0.32 and 0.38 respectively.

TEST EXAMPLE 3-2"

In the above test, dry cutting was performed. In this test, drills similar to those of the Test Samples 12-1-12-23 were prepared, and boring counts were measured as in the above test under the following boring conditions: 40 mm boring depth (L/D=5); and cutting oil: instead of using an air blower, wet cutting, and mist cutting were used. As a result, it was found the Test Samples which had a aluminum nitride film containing a predetermined amount of chlorine as the outermost layer and films with predetermined compositions as the inner layers provided superior lubricity, superior wear resistance, and longer tool life.

TEST EXAMPLE 3-3

Surface-coated drills were prepared using the substrate described below with a widely known PVD method being used to form a coating layer having a composition similar to that of Test Samples 7-2, 7-13 from Table 16. For the drill with a coating layer having a composition similar to that of Test Sample 7-2, the surface-coated drill was formed by adding chlorine to the outermost layer using ion implantation after the coating layer was formed. Then, boring (blind hole) was performed using the same cutting conditions (dry cutting) as Test Example 3-2. The coating layers were all formed at areas associated with cutting.

Also, for the test samples on which the coating layer from Test Sample 7-2 were formed, the chlorine content at the outermost layer was set to 0.2 atomic percent.

1 High Speed Tool Steel Drill Substrate (Solid)

The results indicated that all the surface-coated drills formed with the coating layer from the Test Sample 7-2 provided superior lubricity and wear resistance. It was found that the tool life was at least three times that of drills formed with the conventional coating layer from the Test Sample 7-13.

TEST EXAMPLE 3-4

Solid drill substrates formed from cemented carbide corresponding to JIS K10 (8 mm diameter) were prepared. Thermal CVD, which is a chemical vapor deposition technique, was performed to form a coating layer on the substrate at the surface of the areas (body) associated with cutting based on the film forming conditions from Table 17. In this test, the following layers were formed, starting from the substrate side: an inner layer formed from TiN(0.5), columnar structure TiCN(4), TiBN(0.5), κ-$Al_2O_3$(1) and an outermost layer formed from AlN(1.5). The numbers in parentheses indicate film thickness in microns. Film thickness was controlled by controlling the film forming time. In this test, the TiCN film was grown so that it has a columnar structure with an aspect ratio of 4.2 and so that the (311) plane has the maximum index of orientation TC. More specifically, the TiN film formation conditions (gas composition, pressure, temperature) were set up so that the reaction gas was $CH_3CN$, the temperature was 900 deg C., the pressure was 8 kPa, and the surface roughness Rmax (5 microns reference length) of the TiN film formed below the TiCN film was 0.1 microns. Test samples in which the AlN film at the outermost layer have different chlorine contents were prepared by varying the film forming conditions as shown in Table 17. Table 27 shows chlorine content at the outermost layer. Specifically, samples with more than 0 and no more than 0.5 atomic percent of chlorine, samples with more than 0.5 atomic percent of chlorine, and samples with no chlorine in the outermost layer were prepared. Chlorine content was varied as shown in Table 17 by varying the proportion of hydrogen chloride (HCl) in the reaction gas. Also, depending on the amount of hydrogen chloride, the film forming pressure and the film forming temperature were varied as appropriate. Furthermore, the surface roughness at sites on the outermost layer near the ridge line of the cutting edge at areas that come into contact with the workpiece were studied for test samples containing more than 0 and no more than 0.5 atomic percent of chlorine in the outermost layer. Observation of the tool cross-sections showed that the Rmax for a reference length of 5 microns was no more than 1.3 microns for all samples. More specifically, the Rmax was 0.6 microns for Test Sample 13-2, for example. The chlorine content was measured using XPS (X-ray Photoelectron Spectroscopy).

TABLE 27

| Test sample No. | Outermost layer | Chlorine content (atomic %) |
| --- | --- | --- |
| 13-1 | AlN *[1] | 0.03 |
| 13-2 | AlN *[1] | 0.18 |
| 13-3 | AlN *[1] | 0.48 |
| 13-4 | AlN *[2] | 0 |
| 13-5 | AlN *[3] | 0.98 |

Using the cutting conditions shown in Table 28, the cutting efficiency of the surface-coated drills with outermost layers as shown in Table 27 was observed. For cutting conditions III, the number of holes bored until the tool broke was studied. For cutting conditions IV, the roundness of the holes was studied. The results of the tests are shown in Table 29.

TABLE 28

| Cutting conditions III | Cutting conditions IV |
| --- | --- |
| Drill boring (through-hole) | Drill boring (blind hole) |
| Workpiece: SCM440 | Workpiece: NAK80 |

TABLE 28-continued

| Cutting conditions III | Cutting conditions IV |
| --- | --- |
| Speed: V = 70 m/min | Speed: V = 70 m/min |
| Feed: f = 0.3 mm/rev. | Feed: f = 0.25 mm/rev. |
| Boring depth: 40 mm(L/D = 5) | Boring depth: 40 mm(L/D = 5) |
| Cutting oil: none (external air blower) | Cutting oil: water soluble |

TABLE 29

| Test Sample No. | Cutting conditions III Number of holes before breakage | Cutting conditions IV Roundness of hole entrance (microns) |
| --- | --- | --- |
| 13-1 | At least 500 (no breaks) | 3.8 |
| 13-2 | At least 500 (no breaks) | 1.9 |
| 13-3 | At least 500 (no breaks) | 3.1 |
| 13-4 | 312 | 15.3 |
| 13-5 | 250 | 12.1 |

Based on the results, in Test Samples 13-1 through 13-3, which have aluminum nitride layers with more than 0 and not more than 0.5 atomic percent of chlorine on the outermost layer as shown in Table 29, and predetermined inner TiCN film layers, superior chip ejection properties were provided and damage to the cutting section was reduced, allowing good cuts over an extended period of time. This significantly increased the number of cuts that could be made until the tool broke. This indicates that tool life was extended. For Test Samples 13-1-13-3, it was found that the roundness of the bored holes was superior and that high-precision cutting was possible. Furthermore, these Test Samples 13-1-13-3 provided superior welding resistance and peeling of the coating layer and the like did not take place.

TEST EXAMPLE 3-5

Substrates similar to those from the cemented carbide drill substrates used in Test Example 3-4 were prepared. Thermal CVD was performed on the surface of the area associated with cutting, and coating layers were formed under the film forming conditions (gas composition, pressure, temperature) shown in Table 17. In this test, the following layers were formed, starting from the substrate side: TiN(0.5), columnar structure TiCN(4) or granular structure TiCN(4), TiBN(0.5), $Al_2O_3$—$ZrO_2$(1); and an outermost layer formed from AlN*[1] (1.5) (similar to Test Sample 8-3 from Table 18). The numbers in parentheses indicate film thickness in microns. Film thickness was controlled by controlling the film forming time. In this test, the aspect ratio and the face with the maximum index of orientation of the columnar structure TiCN film are varied, as shown in Table 17, by varying the film forming pressure and temperature as well as by varying the surface roughness and gas conditions for the TiN film formed below the TiCN film. More specifically, the aspect ratio of the TiCN film was set to at least 3 by using $CH_3CN$ as the reaction gas, with the gas temperature set to 920 deg C. and the pressure set to 6 kPa and the $CH_3CN$ reaction gas being introduced gradually. Also, if the TiCN film maximum index of orientation is to be TC(422), for example, the surface roughness Rmax (reference length) of the substrate is set to 0.09 microns and the TiCN film is formed while adjusting the aspect ratio outward from the substrate (away from the substrate). Furthermore, for all the test samples, the surface of the outermost layer was polished after forming the outermost layer so that the section of the outermost layer around the ridge line of the cutting edge that comes into contact with the workpiece had a surface roughness Rmax of 0.4 microns for 5 microns reference length when measured by observing tool cross-sections. Table 30 shows TiCN film structure, aspect ratio, and the face with the maximum index of orientation TC.

TABLE 30

| Test Sample No. | Inner layer TiCN film | | | Number of holes bored during tool life |
|---|---|---|---|---|
| | Structure | Aspect ratio | Face with maximum TC | |
| 14-1 | Columnar | 5.1 | 311 | 800 |
| 14-2 | Columnar | 7.0 | 422 | 920 |
| 14-3 | Columnar | 3.2 | 220 | 900 |
| 14-4 | Columnar | 2.1 | 220 | 250 |
| 14-5 | Columnar | 4.0 | 420 | 210 |
| 14-6 | Granular | — | 311 | 330 |

The surface-coated drills with the TiCN films shown in Table 30 forming an inner layer were used to perform boring operations under the conditions described below, and the number of holes bored until the tool life was reached was measured. The end of tool life was defined to be when flank face wear at the cutting section at the end reached 0.3 microns or when further cutting was not possible due to tool breakage or the like. Table 30 shows the results from the test as well.

Drill Boring (Through-hole)
Workpiece: S50C
Speed: V=80 m/min
Feed: f=0.2 mm/rev.
Hole depth: 40 mm (L/D=5)
Cutting oil: mist (water soluble cutting fluid)

The results show that with a TiCN film as an inner layer as in Table 30, a columnar structure provides superior wear resistance. More specifically, with Test Samples 14-1-14-3, which are formed with columnar structure TiCN film at the inner layer with an aspect ratio of at least 3 and a maximum index of orientation of TC(311), TC(220), or TC(422), wear resistance and breakage resistance are especially superior and tool life is longer. The longer tool life is believed to be because of the superior lubricity of the outermost layer and the use of a predetermined TiCN film with superior wear resistance as the inner layer.

TEST EXAMPLE 3-6

Substrates similar to those from the cemented carbide drill substrates used in Test Example 3-4 were prepared. Thermal CVD was performed on the surface of the area associated with cutting, and coating layers were formed under the film forming conditions (gas composition, pressure, temperature) shown in Table 17 in the same manner as the coating layers shown in Table 22. In this test, as in the Test Example 2-6, the film forming conditions were controlled so that columnar structure TiCN films had an aspect ratio of at least 3 and the maximum index of orientation was TC(311), TC(220), or TC(422).

The surface-coated drills with the coatings shown in Table 22 were used to perform boring operations under the conditions described below, and the number of holes bored until the tool life was reached was measured. The end of tool life was defined to be when flank face wear at the cutting section at the end reached 0.3 microns or when further cutting was not possible due to tool breakage or the like. The results of the tests are shown in Table 31.

Drill boring (blind hole)
Workpiece: S50C
Speed: V=120 m/min
Feed: f=0.2 mm/rev.
Hole depth: 24 mm (L/D=3)
Cutting oil: air blower

TABLE 31

| Test Sample No. | Film structure | Number of holes bored during tool life |
|---|---|---|
| 15-1 | 10-1 | 4000 |
| 15-2 | 10-2 | 4500 |
| 15-3 | 10-3 | 5000 |
| 15-4 | 10-4 | 4500 |
| 15-5 | 10-5 | 5500 |
| 15-6 | 10-6 | 4500 |
| 15-7 | 10-7 | 3500 |
| 15-8 | 10-8 | 4000 |
| 15-9 | 10-9 | 4000 |
| 15-10 | 10-10 | 5500 |
| 15-11 | 10-11 | 4000 |
| 15-12 | 10-12 | 4500 |
| 15-13 | 10-13 | 820 |
| 15-14 | 10-14 | 600 |
| 15-15 | 10-15 | 800 |
| 15-16 | 10-16 | 1050 |
| 15-17 | 10-17 | 1420 |
| 15-18 | 10-18 | 1330 |
| 15-19 | 10-19 | 1200 |
| 15-20 | 10-20 | 510 |
| 15-21 | 10-21 | 1010 |

As a result, it was found as shown in Table 31 that Test Samples 15-1-15-12, 15-16-15-19, 15-21, which had an aluminum nitride film containing a predetermined amount of chlorine as the outermost layer and a columnar structure TiCN film inner layer with an aspect ratio of at least 3 and a maximum index of orientation of TC(311), TC(220), or TC(422), provided superior lubricity and superior wear resistance compared to Test Samples 15-13-15-15, 15-20, which correspond to conventional technologies.

Also, the results shown in Table 31 indicate that it is preferable for the outermost layer to be at least 0.03 microns and for the total film thickness to be at least 0.1 microns and no more than 24 microns. Furthermore, it can be seen that it is preferable for the outermost layer to have no more than ½ the total thickness of the inner layer.

The drills from test sample 15-1-15-21 were all cut and the surface roughness relative to a 5 micron reference length was measured for the area of the outermost layer near the ridge line of the cutting edge of the peripheral cutting edge that comes into contact with the workpiece. As a result, it was found that Rmax was no more than 1.3 microns for all drills except the Test Sample 15-21, while the Rmax of Test Sample 15-21 was 2.0 microns. For Test Sample 15-21, as in Test Sample 10-21, a #1500 diamond paste was used to polish the area of the outermost layer of the peripheral cutting edge near the ridge line of the cutting edge that comes into contact with the workpiece. When the method described above was used to measure surface roughness after polishing, Rmax was 0.52 microns. When boring was performed under the same cutting conditions using the polished drill, the number of operations performed was 4000. This is believed to be caused by a reduction in the cutting force resulting from less roughness at the area of the outermost layer near the ridge line of the cutting edge that comes into contact with the workpiece.

TEST EXAMPLE 3-6'

Surface-coated drills similar to those of Test Samples 15-1-15-21 were prepared and cutting tests were performed under the cutting conditions described below. Crater wear (width) was then measured for a predetermined number of holes (500 holes) near the center of the cutting section.

The measurement of crater wear width was performed in a manner similar to that of the cutting test (Test Example 3-2') that used the surface-coated drills from Test Samples 12-1-12-23.

Workpiece: S50C (blind hole)
Speed: V=100 m/min
Feed: f=0.25 mm/rev.
Hole depth: 40 mm (L/D=5)
Cutting oil: mist (water soluble cutting fluid)

The results showed that Test Samples 15-1-15-12, 15-16-15-19, and 15-21 had less crater wear compared to the other samples. For example, if the wear width of Test Sample 12-14 from Test Example 3-2' is defined as 1, Test Samples 15-3, 15-9 had the values 0.29 and 0.35 respectively.

TEST EXAMPLE 3-6"

In the above test, dry cutting was performed. In this test, drills similar to those of Test Samples 15-1-15-21 were prepared, and boring counts were measured as in the above test under the following boring conditions: 40 mm boring depth (L/D=5); and cutting oil: wet cutting, mist cutting instead of using an air blower. As a result, it was found that the test samples, which had an aluminum nitride film containing a predetermined amount of chlorine as the outermost layer and a columnar structure TiCN film inner layer with an aspect ratio of at least 3 and a maximum index of orientation of TC(311), TC(220), or TC(422), provided superior lubricity and superior wear resistance as well as long tool life.

TEST EXAMPLE 3-7

Surface-coated drills were prepared using the substrate described below with a widely known PVD method being used to form a coating layer having a composition similar to that of Test Samples 10-2, 10-13 from Table 22. For the drill with a coating layer having a composition similar to that of Test Sample 10-2, the surface-coated drill was formed by adding chlorine to the outermost layer using ion implantation after the coating layer was formed. Then, boring (blind hole) was performed using the same cutting conditions (dry cutting) as Test Example 3-6. The coating layers were all formed at areas associated with cutting.

Also, for the test samples on which the coating layer from the Test Sample 10-2 were formed, the chlorine content at the outermost layer was set to 0.2 atomic percent.

1. High Speed Tool Steel Drill Substrate (Solid)

The results indicated that all the surface-coated drills formed with the coating layer from the Test Sample 10-2 provided superior lubricity and wear resistance. It was found that the tool life was at least three times that of drills formed with the conventional coating layer from the Test Sample 10-13.

The surface-coated cutting tool of the present invention is suited for cutting under harsh conditions, e.g., cutting involving high temperatures for the cutting edge such as dry cutting, mist cutting, and intermittent cutting, boring, and cutting of workpieces that tend to weld easily.

Also, the surface-coated cutting tool of the present invention is suited for cutting steel and the like under conditions that tend to lead to welding.

The invention claimed is:

1. A surface-coated cutting tool comprising:
a coating layer on a substrate surface having:
an inner layer formed on a substrate; and
an outermost layer formed over said inner layer;
wherein said inner layer is formed from a compound formed from a first element and a second element, said first element being at least one element selected from a group consisting of a periodic table group IVa, Va, VIa metal, Al, Si, and B, and said second element being at least one element selected from a group consisting of B, C, N, and 0, except, in said inner layer, a film formed solely from B is excluded;
wherein said outermost layer is formed from aluminum nitride or aluminum carbonitride, said outermost layer containing more than 0 and no more than 0.5 atomic percent chlorine, and said outermost layer is formed by thermal CVD using hydrogen chloride as a reaction gas; and
wherein said outermost layer is formed with a film thickness that is no more than ½ a total film thickness of said inner layer.

2. A surface-coated cutting tool according to claim 1 wherein said outermost layer further includes oxygen.

3. A surface-coated cutting tool according to claim 1 wherein said inner layer includes a film formed from a compound containing Ti.

4. A surface-coated cutting tool according to claim 3 wherein said inner layer includes a film formed from TiCN having a columnar structure.

5. A surface-coated cutting tool according to claim 4 wherein said film formed from TiCN has a columnar structure with an aspect ratio of at least 3, where an index of orientation TC(220), TC(311), or TC(422) of a crystal face (220), crystal face (311), or crystal face (422) respectively is a maximum index of orientation.

6. A surface-coated cutting tool according to claim 1 wherein a film hardness of said outermost layer is lower than a hardness of at least one film forming said inner layer.

7. A surface-coated cutting tool according to claim 1 wherein a surface roughness of a section of said outermost layer near a ridge line of a cutting edge has an Rmax relative to a 5 micron reference length of no more than 1.3 microns, where roughness is measured by observing a cross-section of said cutting tool.

8. A surface-coated cutting tool according to claim 1 wherein said substrate is formed from a cermet, high-speed steel, ceramic, a cubic boron nitride sintered body, or a silicon nitride sintered body.

9. A surface-coated cutting tool according to claim 1 wherein said surface-coated cutting tool is a throw-away insert, a drill, or an end mill.

10. A surface-coated cutting tool according to claim 1 wherein:
said surface-coated cutting tool is a throw-away insert; and
said outermost layer has a film thickness of at least 0.03 microns and no more than 10 microns, and said coating layer has a total film thickness of at least 0.1 microns and no more than 30 microns.

11. A surface-coated cutting tool according to claim 1 wherein: said surface-coated cutting tool is a drill or an end mill; and
said outermost layer has a film thickness of at least 0.03 microns and no more than 8 microns, and said coating layer has a total film thickness of at least 0.1 microns and no more than 24 microns.

* * * * *